US012701568B2

(12) United States Patent
Zhang et al.

(10) Patent No.: US 12,701,568 B2
(45) Date of Patent: Aug. 4, 2026

(54) SCHEDULE GAP FOR MULTI-SIM USER EQUIPMENT

(71) Applicant: QUALCOMM Incorporated, San Diego, CA (US)

(72) Inventors: Juan Zhang, Beijing (CN); Gavin Bernard Horn, La Jolla, CA (US); Ozcan Ozturk, San Diego, CA (US); John Wallace Nasielski, San Diego, CA (US)

(73) Assignee: Qualcomm Incorporated, San Diego, CA (US)

( * ) Notice: Subject to any disclaimer, the term of this patent is extended or adjusted under 35 U.S.C. 154(b) by 338 days.

(21) Appl. No.: 17/628,813

(22) PCT Filed: Aug. 19, 2019

(86) PCT No.: PCT/CN2019/101299
§ 371 (c)(1),
(2) Date: Jan. 20, 2022

(87) PCT Pub. No.: WO2021/031060
PCT Pub. Date: Feb. 25, 2021

(65) Prior Publication Data
US 2022/0264587 A1 Aug. 18, 2022

(51) Int. Cl.
*H04W 76/15* (2018.01)
*H04W 8/24* (2009.01)
*H04W 72/12* (2023.01)

(52) U.S. Cl.
CPC ......... *H04W 72/1215* (2013.01); *H04W 8/24* (2013.01); *H04W 76/15* (2018.02)

(58) Field of Classification Search
CPC .... H04W 76/15; H04W 8/24; H04W 72/1215
See application file for complete search history.

(56) References Cited

U.S. PATENT DOCUMENTS

| | | | | |
|---|---|---|---|---|
| 9,497,797 | B2 * | 11/2016 | Deparis ................. | H04W 24/08 |
| 10,003,990 | B2 * | 6/2018 | Scholand .......... | H04W 52/0238 |
| 10,687,379 | B1 * | 6/2020 | Shalev .................. | H04W 76/16 |
| 12,317,296 | B2 * | 5/2025 | Zhang .................. | H04B 7/0695 |
| 2010/0317348 | A1 * | 12/2010 | Burbidge .......... | H04W 36/0066 455/436 |
| 2011/0103277 | A1 * | 5/2011 | Watfa ................ | H04W 36/0033 370/310 |
| 2011/0250839 | A1 * | 10/2011 | Lee ......................... | H04W 8/22 455/41.1 |

(Continued)

FOREIGN PATENT DOCUMENTS

| | | |
|---|---|---|
| CN | 108605224 A | 9/2018 |
| WO | 2018141148 A1 | 8/2018 |

(Continued)

OTHER PUBLICATIONS

International Search Report and Written Opinion—PCT/CN2019/101299—ISA/EPO—May 18, 2020.

(Continued)

*Primary Examiner* — Syed Ali
(74) *Attorney, Agent, or Firm* — Qualcomm Incorporated

(57) ABSTRACT

Certain aspects of the present disclosure provide techniques for supporting scheduling gaps for user equipments (UEs) with multiple subscriber identity modules (SIMS).

22 Claims, 12 Drawing Sheets

(56) References Cited

U.S. PATENT DOCUMENTS

| | | | | |
|---|---|---|---|---|
| 2014/0050128 A1* | 2/2014 | Campoy Cervera | . | H04W 16/14 |
| | | | | 370/280 |
| 2015/0289314 A1 | 10/2015 | Yang et al. | | |
| 2015/0312787 A1 | 10/2015 | Das et al. | | |
| 2015/0334740 A1 | 11/2015 | Yang et al. | | |
| 2016/0302114 A1* | 10/2016 | Jain | ...................... | H04W 36/304 |
| 2016/0330653 A1 | 11/2016 | Yang et al. | | |
| 2017/0064584 A1* | 3/2017 | Shan | ...................... | H04W 76/10 |
| 2019/0053130 A1 | 2/2019 | Guo et al. | | |
| 2020/0153517 A1* | 5/2020 | Akkarakaran | .... | H04W 56/0055 |
| 2022/0191893 A1* | 6/2022 | Miao | ................. | H04W 72/1263 |
| 2022/0361133 A1* | 11/2022 | Shaheen | ................. | H04W 8/20 |

FOREIGN PATENT DOCUMENTS

| | | | |
|---|---|---|---|
| WO | 2019125508 A1 | 6/2019 | |
| WO | 2021031060 A1 | 2/2021 | |

OTHER PUBLICATIONS

Samsung: "FS_MUSIM 22834 P-CR: Definitions," 3GPP TSG-SA WG1 Meeting #86, S1-191029, May 10, 2019 (May 10, 2019), the whole document, 2 pages.

Vivo, et al., Considerations on Multi-SIM Study in RAN, 3GPP TSG RAN Meeting #84, RP-191304, Jun. 6, 2019 (Jun. 6, 2019), the whole document, 7 pages.

Ericsson: "Remove 5GS Related Impact from TS 23.401", 3GPP TSG-SA WG2 Meeting #126, S2-181744 CR 3395 23.401— Reverting 5G5-Related Changes Applied to TS 23.401 PA2, 3rd Generation Partnership Project, Mobile Competence Centre, 650, Route Des Lucioles, F-06921 S, vol. SA WG2, No. Montreal, Canada, 2018-Feb. 26, 2018-Mar. 2, 2018 Feb. 20, 2018, XP051408342, 17 Pages, p. 12, clause 17, p. 14, clause 20.

Supplementary European Search Report—EP19942414—Search Authority—Munich—May 15, 2023.

Supplementary Partial European Search Report—EP19942414— Search Authority—Munich—Feb. 17, 2023.

European Search Report—EP24215536—Search Authority— Munich—Jan. 23, 2025.

* cited by examiner

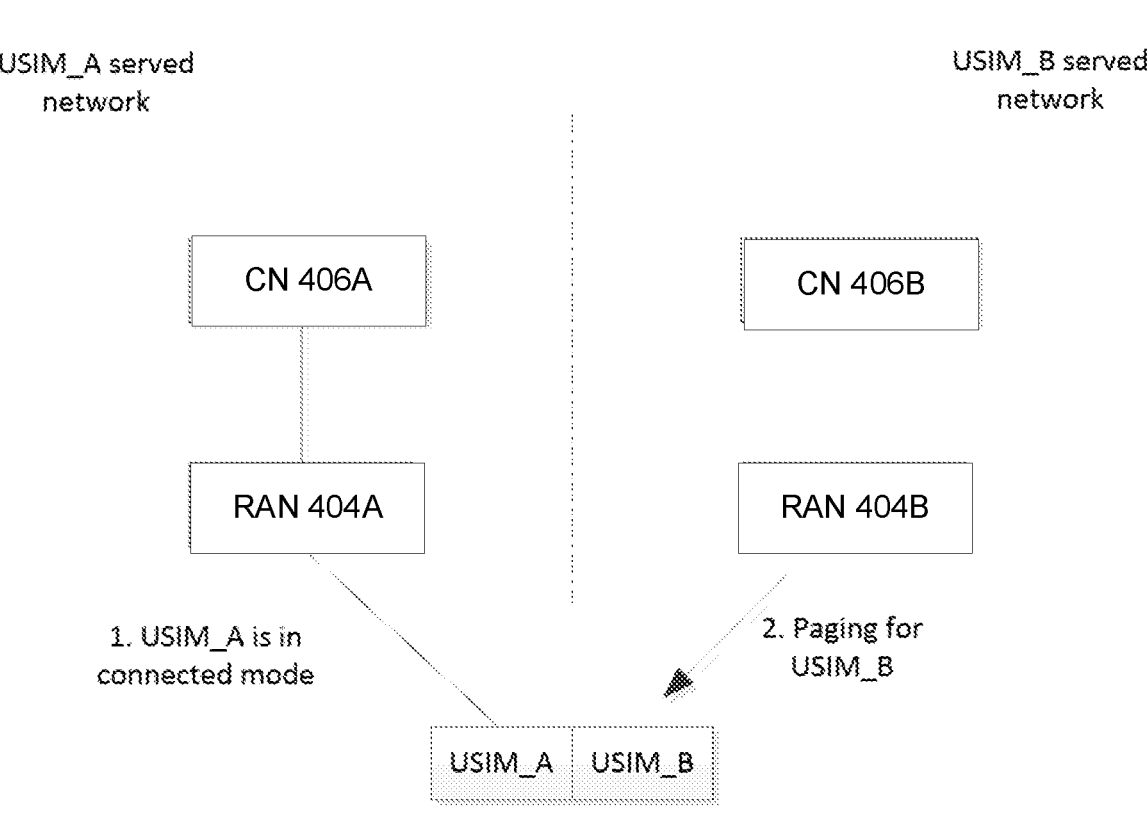
USIM_A served
network
USIM_B served
network
CN 406A
CN 406B
RAN 404A
RAN 404B
1. USIM_A is in
connected mode
2. Paging for
USIM_B
USIM_A | USIM_B
3. UE decides to respond
paging for USIM_B and
enters connected mode
for USIM_B
FIG. 4

700

702

IDENTIFY A NETWORK TO ACCESS FOR COMMUNICATIONS

704

TRANSMIT AN INDICATION OF SCHEDULE GAP SUPPORT INFORMATION FOR THE UE TO THE NETWORK, THE SCHEDULE GAP SUPPORT INFORMATION COMPRISING INFORMATION ASSOCIATED WITH TRANSITIONING FROM A FIRST RAN ASSOCIATED WITH A FIRST USIM OF THE UE TO AT LEAST A SECOND RAN ASSOCIATED WITH A SECOND USIM OF THE UE

800

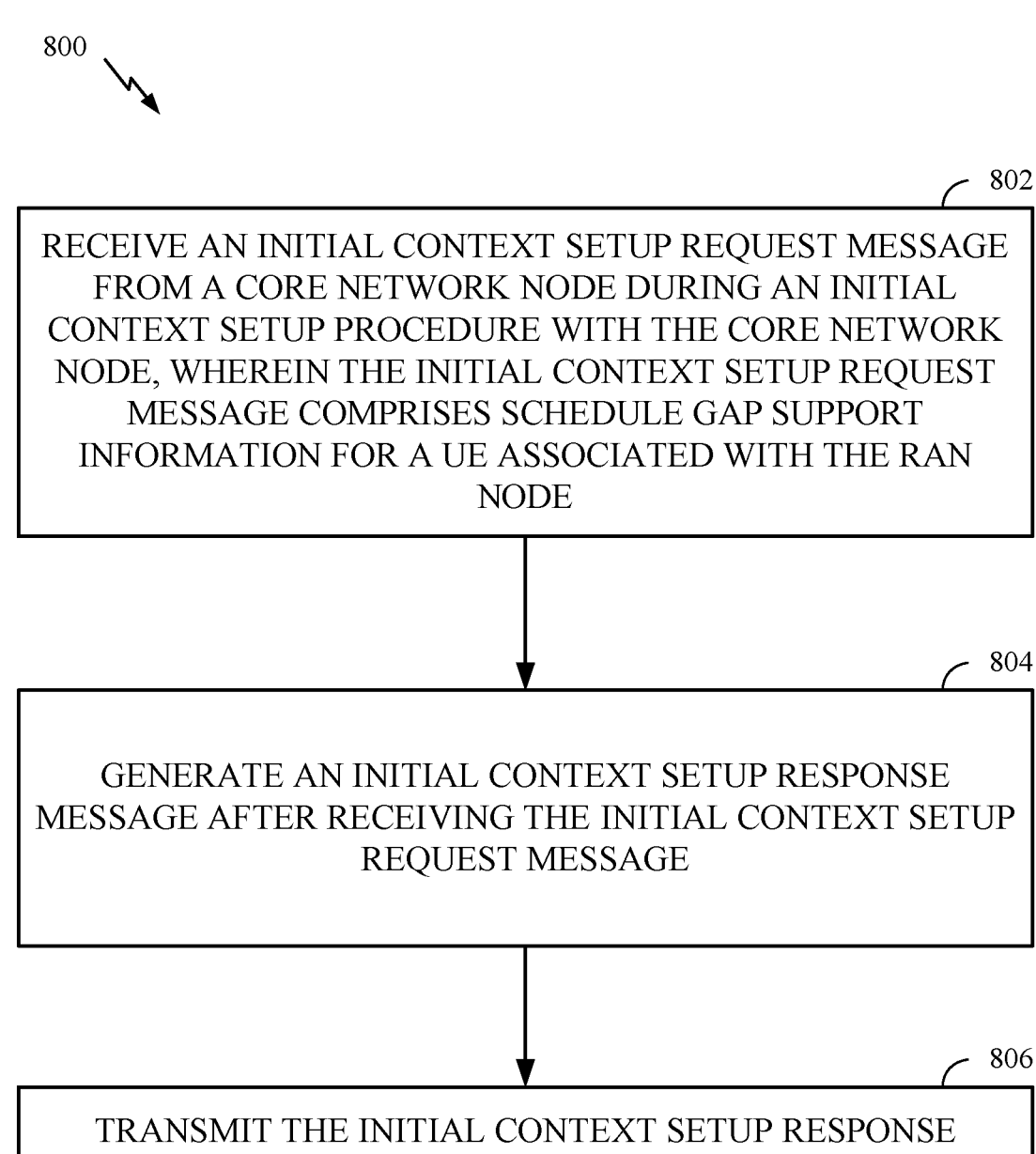

802

RECEIVE AN INITIAL CONTEXT SETUP REQUEST MESSAGE FROM A CORE NETWORK NODE DURING AN INITIAL CONTEXT SETUP PROCEDURE WITH THE CORE NETWORK NODE, WHEREIN THE INITIAL CONTEXT SETUP REQUEST MESSAGE COMPRISES SCHEDULE GAP SUPPORT INFORMATION FOR A UE ASSOCIATED WITH THE RAN NODE

804

GENERATE AN INITIAL CONTEXT SETUP RESPONSE MESSAGE AFTER RECEIVING THE INITIAL CONTEXT SETUP REQUEST MESSAGE

806

TRANSMIT THE INITIAL CONTEXT SETUP RESPONSE MESSAGE

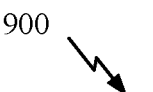

902

TRANSMIT AN INITIAL CONTEXT SETUP REQUEST MESSAGE TO A RAN NODE DURING AN INITIAL CONTEXT SETUP PROCEDURE WITH THE RAN NODE, WHEREIN THE INITIAL CONTEXT SETUP REQUEST MESSAGE COMPRISES SCHEDULE GAP SUPPORT INFORMATION FOR A UE ASSOCIATED WITH THE RAN NODE

904

RECEIVE, IN RESPONSE TO THE INITIAL CONTEXT SETUP REQUEST MESSAGE, AN INITIAL CONTEXT SETUP RESPONSE MESSAGE FROM THE RAN NODE DURING THE INITIAL CONTEXT SETUP PROCEDURE

FIG. 9

SCHEDULE GAP FOR MULTI-SIM USER EQUIPMENT

CROSS-REFERENCE TO RELATED APPLICATIONS

This application is a national stage application under 35 U.S.C. 371 of PCT/CN2019/101299, filed Aug. 19, 2019, which is hereby expressly incorporated by reference herein in its entirety as if fully set forth below and for all applicable purposes.

BACKGROUND

Field of the Disclosure

Aspects of the present disclosure relate to wireless communications, and more particularly, to techniques for configuring scheduling gaps for user equipments (UEs) equipped with multiple universal subscriber identity modules (USIMs).

Description of Related Art

Wireless communication systems are widely deployed to provide various telecommunication services such as telephony, video, data, messaging, broadcasts, etc. These wireless communication systems may employ multiple-access technologies capable of supporting communication with multiple users by sharing available system resources (e.g., bandwidth, transmit power, etc.). Examples of such multiple-access systems include 3rd Generation Partnership Project (3GPP) Long Term Evolution (LTE) systems, LTE Advanced (LTE-A) systems, code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems, to name a few.

These multiple access technologies have been adopted in various telecommunication standards to provide a common protocol that enables different wireless devices to communicate on a municipal, national, regional, and even global level. New radio (e.g., 5G NR) is an example of an emerging telecommunication standard. NR is a set of enhancements to the LTE mobile standard promulgated by 3GPP. NR is designed to better support mobile broadband Internet access by improving spectral efficiency, lowering costs, improving services, making use of new spectrum, and better integrating with other open standards using OFDMA with a cyclic prefix (CP) on the downlink (DL) and on the uplink (UL). To these ends, NR supports beamforming, multiple-input multiple-output (MIMO) antenna technology, and carrier aggregation.

However, as the demand for mobile broadband access continues to increase, there exists a need for further improvements in NR and LTE technology. Preferably, these improvements should be applicable to other multi-access technologies and the telecommunication standards that employ these technologies.

SUMMARY

The systems, methods, and devices of the disclosure each have several aspects, no single one of which is solely responsible for its desirable attributes. Without limiting the scope of this disclosure as expressed by the claims which follow, some features will now be discussed briefly. After considering this discussion, and particularly after reading the section entitled "Detailed Description" one will understand how the features of this disclosure provide advantages that include improved techniques for supporting scheduling gaps for UEs equipped with multiple universal subscriber identity modules (USIMs).

Certain aspects provide a method for wireless communication that may be performed by a UE. The method generally includes identifying a network to access for communications; and transmitting an indication of schedule gap support information for the UE to the network, the schedule gap support information comprising information associated with transitioning from a first radio access network (RAN) associated with a first universal subscriber identity module (USIM) of the UE to at least a second RAN associated with a second USIM of the UE.

Certain aspects provide an apparatus for wireless communication. The apparatus generally includes means for identifying a network to access for communications; and means for transmitting an indication of schedule gap support information for the apparatus to the network, the schedule gap support information comprising information associated with transitioning from a first radio access network (RAN) associated with a first universal subscriber identity module (USIM) of the apparatus to at least a second RAN associated with a second USIM of the apparatus.

Certain aspects provide an apparatus for wireless communication. The apparatus generally includes at least one processor, a transmitter, and a memory coupled to the at least one processor. The at least one processor is configured to identify a network to access for communications. The transmitter is configured to transmit an indication of schedule gap support information for the apparatus to the network, the schedule gap support information comprising information associated with transitioning from a first radio access network (RAN) associated with a first universal subscriber identity module (USIM) of the apparatus to at least a second RAN associated with a second USIM of the apparatus.

Certain aspects provide a computer readable medium having computer executable code stored thereon for wireless communications by a UE. The computer executable code generally includes code identifying a network to access for communications; and code for transmitting an indication of schedule gap support information for the UE to the network, the schedule gap support information comprising information associated with transitioning from a first radio access network (RAN) associated with a first universal subscriber identity module (USIM) of the UE to at least a second RAN associated with a second USIM of the UE.

Certain aspects provide a method for wireless communication that may be performed by a radio access network (RAN) node. The method generally includes receiving an initial context setup request message from a core network node during an initial context setup procedure with the core network node, wherein the initial context setup request message comprises schedule gap support information for a user equipment (UE) associated with the RAN node; generating an initial context setup response message after receiving the initial context setup request message; and transmitting the initial context setup response message.

Certain aspects provide an apparatus for wireless communication. The apparatus generally includes means for receiving an initial context setup request message from a core network node during an initial context setup procedure with the core network node, wherein the initial context setup request message comprises schedule gap support information for a user equipment (UE) associated with the apparatus; means for generating an initial context setup response message after receiving the initial context setup request message; and means for transmitting the initial context setup response message.

Certain aspects provide an apparatus for wireless communication. The apparatus generally includes a receiver, a transmitter, at least one processor, and a memory coupled to the at least one processor. The receiver is configured to receive an initial context setup request message from a core network node during an initial context setup procedure with the core network node, wherein the initial context setup request message comprises schedule gap support information for a user equipment (UE) associated with the apparatus. The at least one processor is configured to generate an initial context setup response message after receiving the initial context setup request message. The transmitter is configured to transmit the initial context setup response message.

Certain aspects provide a computer readable medium having computer executable code stored thereon for wireless communications by a RAN node. The computer executable code generally includes code for receiving an initial context setup request message from a core network node during an initial context setup procedure with the core network node, wherein the initial context setup request message comprises schedule gap support information for a user equipment (UE) associated with the RAN node; code for generating an initial context setup response message after receiving the initial context setup request message; and code for transmitting the initial context setup response message.

Certain aspects provide a method for wireless communication that may be performed by a core network node. The method generally includes transmitting an initial context setup request message to a radio access network (RAN) node during an initial context setup procedure with the RAN node, wherein the initial context setup request message comprises schedule gap support information for a user equipment (UE) associated with the RAN node; and receiving, in response to the initial context setup request message, an initial context setup response message from the RAN node during the initial context setup procedure.

Certain aspects provide an apparatus for wireless communication. The apparatus generally includes means for transmitting an initial context setup request message to a radio access network (RAN) node during an initial context setup procedure with the RAN node, wherein the initial context setup request message comprises schedule gap support information for a user equipment (UE) associated with the RAN node; and means for receiving, in response to the initial context setup request message, an initial context setup response message from the RAN node during the initial context setup procedure.

Certain aspects provide an apparatus for wireless communication. The apparatus generally includes a transmitter, a receiver, at least one processor, and a memory coupled to the at least one processor. The transmitter is configured to transmit an initial context setup request message to a radio access network (RAN) node during an initial context setup procedure with the RAN node, wherein the initial context setup request message comprises schedule gap support information for a user equipment (UE) associated with the RAN node. The receiver is configured to receive, in response to the initial context setup request message, an initial context setup response message from the RAN node during the initial context setup procedure.

Certain aspects provide a computer readable medium having computer executable code stored thereon for wireless communications by a core network node. The computer executable code generally includes code for transmitting an initial context setup request message to a radio access network (RAN) node during an initial context setup procedure with the RAN node, wherein the initial context setup request message comprises schedule gap support information for a user equipment (UE) associated with the RAN node; and code for receiving, in response to the initial context setup request message, an initial context setup response message from the RAN node during the initial context setup procedure.

To the accomplishment of the foregoing and related ends, the one or more aspects comprise the features hereinafter fully described and particularly pointed out in the claims. The following description and the appended drawings set forth in detail certain illustrative features of the one or more aspects. These features are indicative, however, of but a few of the various ways in which the principles of various aspects may be employed.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the drawings. It is to be noted, however, that the appended drawings illustrate only certain typical aspects of this disclosure and are therefore not to be considered limiting of its scope, for the description may admit to other equally effective aspects.

FIG. 4 depicts an example system architecture for a multi-USIM UE interworking between two systems/networks, in accordance with certain aspects of the present disclosure.

FIG. 8 is a flow diagram illustrating example operations for wireless communication by a RAN node, in accordance with certain aspects of the present disclosure.

FIG. 9 is a flow diagram illustrating example operations for wireless communication by a CN node, in accordance with certain aspects of the present disclosure.

To facilitate understanding, identical reference numerals have been used, where possible, to designate identical elements that are common to the figures. It is contemplated that elements disclosed in one aspect may be beneficially utilized on other aspects without specific recitation.

DETAILED DESCRIPTION

Figure 1:
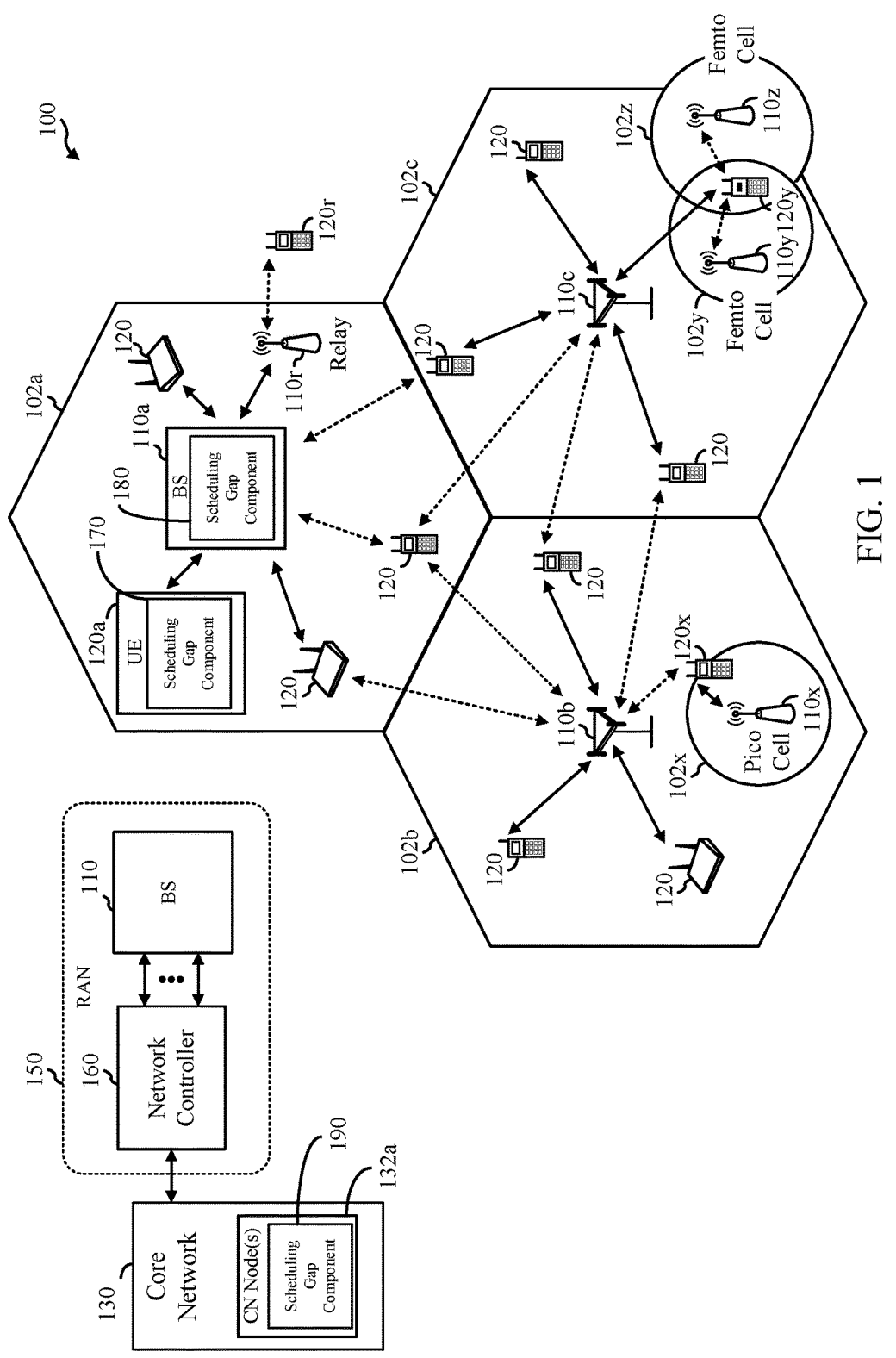
FIG. 1 is a block diagram conceptually illustrating an example telecommunications system, in accordance with certain aspects of the present disclosure.

Aspects of the present disclosure provide apparatus, methods, processing systems, and computer readable mediums for enabling UEs equipped with multiple USIMs to request scheduling (or schedule) gaps from a RAN serving the UE via a first USIM (e.g., the RAN is in a connected mode with the UE via the first USIM), such that the UE can communicate with other RANs via other USIM(s) without missing downlink data received by the serving RAN that is destined for the UE.

Certain systems (e.g., 5G NR, LTE, etc.) may support communications with UEs equipped with multiple USIMs. A multi-USIM device implementation generally involves the use of common radio and baseband components that are shared among the multiple USIMs. For example, while actively communicating with a first system (e.g., RAN/CN A) via a first USIM, the UE may occasionally transition to one or more second systems (e.g., RAN/CN B to RAN/CN K) via one or more second USIMs to perform one or more communication operations (e.g., monitor a paging channel used by the second system, perform signal measurements, read system information, etc.). In such situations, if the first system is unaware that the UE has to transition (or already has transitioned) to other systems, the first system may send downlink data to the UE during a time in which the UE has transitioned to another system and is in connected mode with the other system. This can cause the UE to miss (e.g., not receive) the downlink data transmission from the first system, significantly reducing network efficiency and performance.

To address this, aspects provide techniques for configuring schedule gap support information that can be used to enable the UE to request scheduling gaps from a network (e.g., RAN/CN). The schedule gap support information, for example, may include information associated with transitioning (or tuning away) from a first RAN associated with a first USIM of the UE to at least a second RAN associated with a second USIM of the UE. As described in more detail below, in some aspects, the schedule gap support information may indicate whether the UE is allowed to request a schedule gap, under what conditions (e.g., time periods, operating bands, operating radio access technologies (RATs), network conditions, etc.) the UE is allowed to request a schedule gap, and/or parameter(s) of the schedule gaps (e.g., duration of the schedule gap(s), periodicity of the schedule gap(s), etc.).

As described in more detail below, in some aspects, the schedule gap support information may be based in part on capabilities of the UE, capabilities of the network (e.g., RAN and/or CN), and/or (UE or network) policies. In some aspects, the schedule gap support information may be negotiated based on information exchanged between the UE, the RAN, and/or the CN. By configuring scheduling gap support information that can be used by the UE to request particular schedule gaps from the network, aspects herein can significantly reduce the chances of the UE missing downlink data due to transitioning to another system.

Though certain aspects are described with respect to UEs equipped with two USIMs, it should be noted that the aspects herein may be applied to UEs equipped with any number of USIMs.

The following description provides examples of configuring schedule gap support information for multi-USIM devices in communication systems, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method which is practiced using other structure, functionality, or structure and functionality in addition to, or other than, the various aspects of the disclosure set forth herein. It should be understood that any aspect of the disclosure disclosed herein may be embodied by one or more elements of a claim. The word "exemplary" is used herein to mean "serving as an example, instance, or illustration." Any aspect described herein as "exemplary" is not necessarily to be construed as preferred or advantageous over other aspects.

In general, any number of wireless networks may be deployed in a given geographic area. Each wireless network may support a particular RAT and may operate on one or more frequencies. A RAT may also be referred to as a radio technology, an air interface, etc. A frequency may also be referred to as a carrier, a subcarrier, a frequency channel, a tone, a subband, etc. Each frequency may support a single RAT in a given geographic area in order to avoid interference between wireless networks of different RATs. In some cases, a 5G NR RAT network may be deployed.

FIG. 1 illustrates an example wireless communication network 100 in which aspects of the present disclosure may be performed. For example, the wireless communication network 100 may be an NR system (e.g., a 5G NR network), a LTE system, or system that supports both NR and LTE.

As illustrated in FIG. 1, the wireless communication network 100 may include a number of base stations (BSs) 110a-z (each also individually referred to herein as BS 110 or collectively as BSs 110) and other network entities. A BS 110 may provide communication coverage for a particular geographic area, sometimes referred to as a "cell", which may be stationary or may move according to the location of a mobile BS 110. In some examples, the BSs 110 may be interconnected to one another and/or to one or more other BSs or network nodes (not shown) in wireless communication network 100 through various types of backhaul interfaces (e.g., a direct physical connection, a wireless connection, a virtual network, or the like) using any suitable transport network. In the example shown in FIG. 1, the BSs 110a, 110b and 110c may be macro BSs for the macro cells 102a, 102b and 102c, respectively. The BS 110x may be a pico BS for a pico cell 102x. The BSs 110y and 110z may be femto BSs for the femto cells 102y and 102z, respectively. A BS may support one or multiple cells. The BSs 110 communicate with user equipment (UEs) 120a-y (each also individually referred to herein as UE 120 or collectively as UEs 120) in the wireless communication network 100. The UEs 120 (e.g., 120x, 120y, etc.) may be dispersed throughout the wireless communication network 100, and each UE 120 may be stationary or mobile.

Wireless communication network 100 may also include relay stations (e.g., relay station 110r), also referred to as relays or the like, that receive a transmission of data and/or other information from an upstream station (e.g., a BS 110a or a UE 120r) and sends a transmission of the data and/or other information to a downstream station (e.g., a UE 120 or a BS 110), or that relays transmissions between UEs 120, to facilitate communication between devices.

A RAN 150 may include a network controller 160 and the BS(s) 110. The RAN 150 may be in communication with a core network (CN) 130, which includes one or more CN nodes 132a. The network controller 160 may couple to a set of BSs 110 and provide coordination and control for these BSs 110. The network controller 160 may communicate with the BSs 110 via a backhaul. The BSs 110 may also communicate with one another (e.g., directly or indirectly) via wireless or wireline backhaul. Although a single RAN 150 and a single CN 130 are depicted in FIG. 1, the wireless communication network 100 may include multiple RANs 150 and/or multiple CNs 130. Further, in some cases, the wireless communication network 100 may support RANs/CNs of same RATs, different RATs, or a combination of RATs.

As illustrated, UE 120a includes a scheduling gap component 170, which is configured to implement one or more techniques described herein for configuring scheduling gap support information. Using the scheduling gap component 170, the UE 120a may identify a network (e.g., RAN/CN) to access for communications and may transmit an indication of schedule gap support information for the UE to the network. The schedule gap support information may include information associated with the UE transitioning from a first RAN associated with a first USIM of the UE to at least a second RAN associated with a second USIM of the UE.

As also illustrated, BS 110a (e.g., RAN entity or RAN node, such as a gNB or eNB) includes a scheduling gap component 180, which is configured to implement one or more techniques described herein for configuring scheduling gap support information. Using the scheduling gap component 180, the BS 110a may receive an initial context setup request message from a CN node (e.g., CN node 132a, such as an Access and Mobility Management Function (AMF) or Mobility Management Entity (MME)) during an initial context setup procedure with the CN node. The initial context setup request message may include schedule gap support information for a UE (e.g., UE 120a) associated with the BS 110a. For example, the BS 110a may be in a radio resource control (RRC) connected mode with a particular USIM (e.g., USIM A) of the UE. Using the scheduling gap component 180, the BS 110a may generate an initial context setup response message after receiving the initial context setup request message and transmit the initial context setup response message (e.g., to the CN node).

As further illustrated, CN node 132a (e.g., AMF or MME) includes a scheduling gap component 190, which is configured to implement one or more techniques described herein for configuring scheduling gap support information. Using the scheduling gap component 190, the CN node 132a may transmit an initial context setup request message to a RAN node (e.g., BS 110a) during an initial context setup procedure with the RAN node. The initial context setup request message may include schedule gap support information for a UE (e.g., UE 120a) associated with the RAN node. For example, as noted, the RAN node may be in an RRC connected mode with a particular USIM (e.g., USIM A) of the UE. The CN 132a (using the scheduling gap component 190) may receive, in response to the initial context setup request message, an initial context setup response message from the RAN node during the initial context setup procedure.

Figure 2:
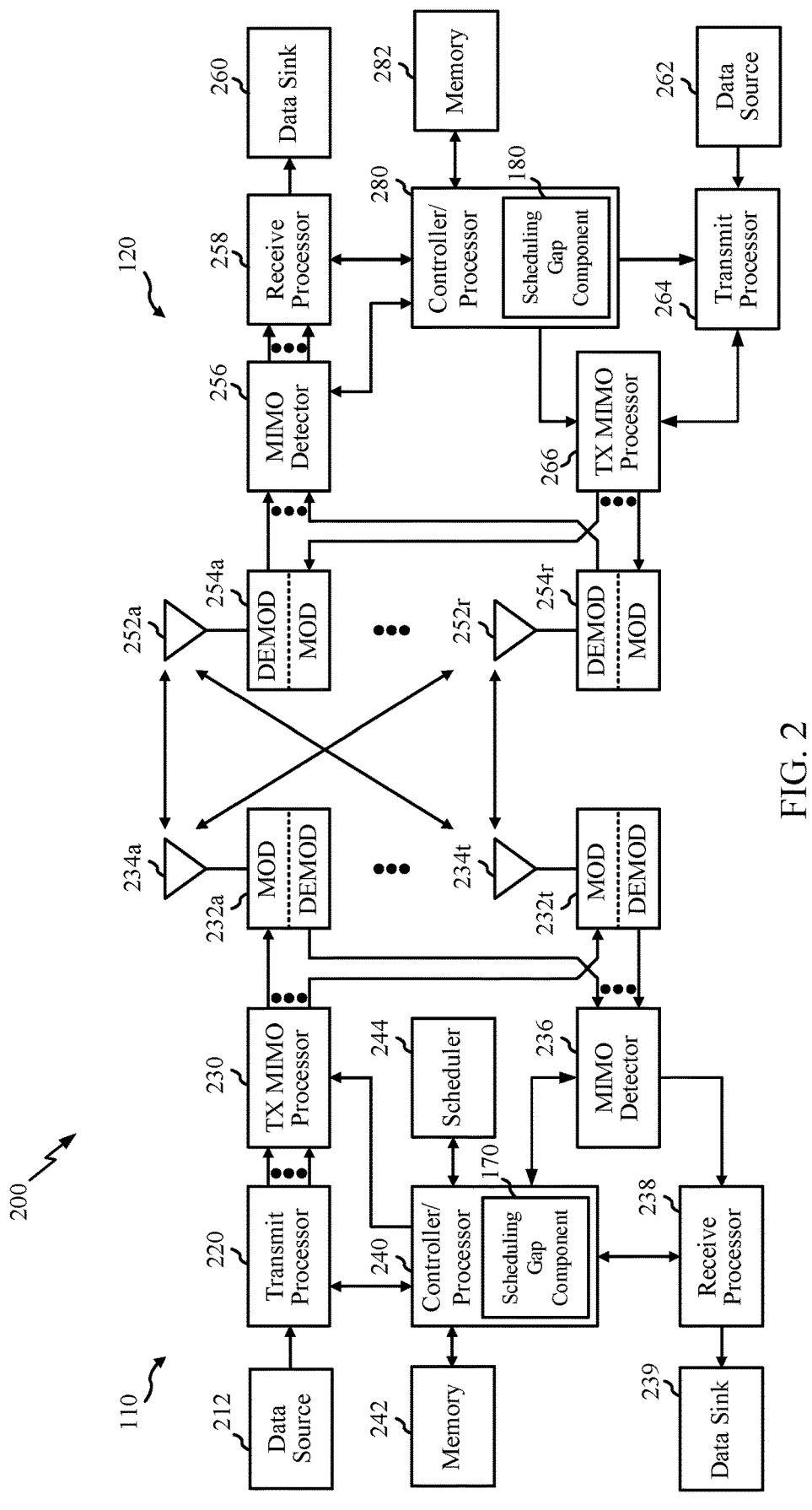
FIG. 2 is a block diagram conceptually illustrating a design of an example a base station (BS) and user equipment (UE), in accordance with certain aspects of the present disclosure.

FIG. 2 illustrates example components of BS 110a and UE 120a (e.g., in the wireless communication network 100 of FIG. 1), which may be used to implement aspects of the present disclosure.

At the BS 110a, a transmit processor 220 may receive data from a data source 212 and control information from a controller/processor 240. The control information may be for the physical broadcast channel (PBCH), physical control format indicator channel (PCFICH), physical hybrid ARQ indicator channel (PHICH), physical downlink control channel (PDCCH), group common PDCCH (GC PDCCH), etc. The data may be for the physical downlink shared channel (PDSCH), etc. The processor 220 may process (e.g., encode and symbol map) the data and control information to obtain data symbols and control symbols, respectively. The transmit processor 220 may also generate reference symbols, such as for the primary synchronization signal (PSS), secondary synchronization signal (SSS), and cell-specific reference signal (CRS). A transmit (TX) multiple-input multiple-output (MIMO) processor 230 may perform spatial processing (e.g., precoding) on the data symbols, the control symbols, and/or the reference symbols, if applicable, and may provide output symbol streams to the modulators (MODs) 232a-232t. Each modulator 232 may process a respective output symbol stream (e.g., for OFDM, etc.) to obtain an output sample stream. Each modulator may further process (e.g., convert to analog, amplify, filter, and upconvert) the output sample stream to obtain a downlink signal. Downlink signals from modulators 232a-232t may be transmitted via the antennas 234a-234t, respectively.

At the UE 120a, the antennas 252a-252r may receive the downlink signals from the BS 110a and may provide received signals to the demodulators (DEMODs) in transceivers 254a-254r, respectively. Each demodulator 254 may condition (e.g., filter, amplify, downconvert, and digitize) a respective received signal to obtain input samples. Each demodulator may further process the input samples (e.g., for OFDM, etc.) to obtain received symbols. A MIMO detector 256 may obtain received symbols from all the demodulators 254a-254r, perform MIMO detection on the received symbols if applicable, and provide detected symbols. A receive processor 258 may process (e.g., demodulate, deinterleave, and decode) the detected symbols, provide decoded data for the UE 120a to a data sink 260, and provide decoded control information to a controller/processor 280.

On the uplink, at UE 120a, a transmit processor 264 may receive and process data (e.g., for the physical uplink shared channel (PUSCH)) from a data source 262 and control information (e.g., for the physical uplink control channel (PUCCH) from the controller/processor 280. The transmit processor 264 may also generate reference symbols for a reference signal (e.g., for the sounding reference signal (SRS)). The symbols from the transmit processor 264 may be precoded by a TX MIMO processor 266 if applicable, further processed by the demodulators in transceivers 254a-

254$r$ (e.g., for SC-FDM, etc.), and transmitted to the BS 110$a$. At the BS 110$a$, the uplink signals from the UE 120$a$ may be received by the antennas 234, processed by the modulators 232, detected by a MIMO detector 236 if applicable, and further processed by a receive processor 238 to obtain decoded data and control information sent by the UE 120$a$. The receive processor 238 may provide the decoded data to a data sink 239 and the decoded control information to the controller/processor 240.

The memories 242 and 282 may store data and program codes for BS 110$a$ and UE 120$a$, respectively. A scheduler 244 may schedule UEs for data transmission on the downlink and/or uplink.

The controller/processor 280 and/or other processors and modules at the UE 120$a$ may perform or direct the execution of processes for the techniques described herein. For example, as shown in FIG. 2, the controller/processor 280 of the UE 120$a$ has a scheduling gap component 170, which is configured to implement one or more techniques described herein for configuring schedule gap support information, according to aspects described herein. Similarly, the controller/processor 240 and/or other processors and modules at the BS 110$a$ may perform or direct the execution of processes for the techniques described herein. For example, as shown in FIG. 2, the controller/processor 240 of the BS 110$a$ has a scheduling gap component 180, which is configured to implement one or more techniques described herein for configuring schedule gap support information, according to aspects described herein. Further, although not shown in FIG. 2, a CN node may include a controller/processor and/or other processors and modules that perform or direct the execution of processes for the techniques described herein. For example, the controller/processor of the CN node may include a scheduling gap component 190, which is configured to implement one or more techniques described herein for configuring schedule gap support information, according to aspects described herein. Although shown at the Controller/Processor, other components of the UE 120$a$ and BS 110$a$ may be used performing the operations described herein.

Figure 3:
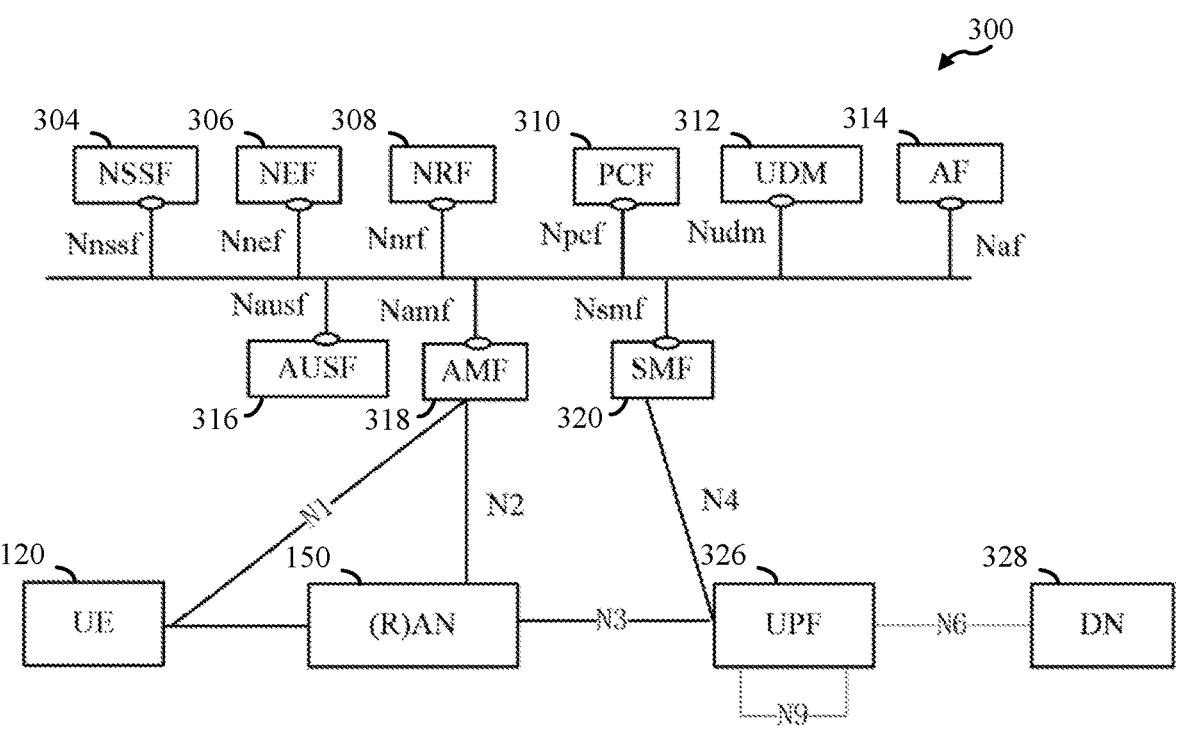
FIG. 3 is a block diagram illustrating an example architecture of a core network (CN) in communication with a radio access network (RAN), in accordance with certain aspects of the present disclosure.

FIG. 3 is a block diagram illustrating an example architecture of a CN 300 (e.g., the CN 130 in FIG. 1) in communication with a RAN 150, in accordance with certain aspects of the present disclosure. As shown in FIG. 2, the example architecture includes the CN 300, RAN 150, UE 120, and data network (DN) 328 (e.g. operator services, Internet access or third party services).

The CN 300 may host core network functions. CN 300 may be centrally deployed. CN 300 functionality may be offloaded (e.g., to advanced wireless services (AWS)), in an effort to handle peak capacity. As shown in FIG. 3, the example CN 300 may be implemented by one or more network entities that perform network functions (NF) including Network Slice Selection Function (NSSF) 304, Network Exposure Function (NEF) 306, NF Repository Function (NRF) 308, Policy Control Function (PCF) 310, Unified Data Management (UDM) 312, Application Function (AF) 314, Authentication Server Function (AUSF) 316, AMF 318, Session Management Function (SMF) 320; User Plane Function (UPF) 326, and various other functions (not shown) such as Unstructured Data Storage Function (UDSF); Unified Data Repository (UDR); 5G-Equipment Identity Register (5G-EIR); and/or Security Edge Protection Proxy (SEPP).

The AMF 318 may include the following functionality (some or all of the AMF functionalities may be supported in one or more instances of an AMF): termination of RAN control plane (CP) interface (N2); termination of non-access stratum (NAS) (e.g., N1), NAS ciphering and integrity protection; registration management; connection management; reachability management; mobility management; lawful intercept (for AMF events and interface to L1 system); transport for session management (SM) messages between UE 120 and SMF 320; transparent proxy for routing SM messages; access authentication; access authorization; transport for short message service (SMS) messages between UE 120 and a SMS function (SMSF); Security Anchor Functionality (SEAF); Security Context Management (SCM), which receives a key from the SEAF that it uses to derive access-network specific keys; Location Services management for regulatory services; transport for Location Services messages between UE 120 and a location management function (LMF) as well as between RAN 150 and LMF; evolved packet service (EPS) bearer ID allocation for interworking with EPS; and/or UE mobility event notification; and/or other functionality.

SMF 320 may support: session management (e.g., session establishment, modification, and release), UE IP address allocation and management, dynamic host configuration protocol (DHCP) functions, termination of NAS signaling related to session management, downlink data notification, and traffic steering configuration for UPF for proper traffic routing. UPF 326 may support: packet routing and forwarding, packet inspection, quality-of-service (QoS) handling, external protocol data unit (PDU) session point of interconnect to DN 328, and anchor point for intra-RAT and inter-RAT mobility. PCF 310 may support: unified policy framework, providing policy rules to control protocol functions, and/or access subscription information for policy decisions in UDR. AUSF 316 may acts as an authentication server. UDM 312 may support: generation of Authentication and Key Agreement (AKA) credentials, user identification handling, access authorization, and subscription management. NRF 308 may support: service discovery function, and maintain NF profile and available NF instances. NSSF may support: selecting of the Network Slice instances to serve the UE 120, determining the allowed network slice selection assistance information (NSSAI), and/or determining the AMF set to be used to serve the UE 120.

NEF 306 may support: exposure of capabilities and events, secure provision of information from external application to 3GPP network, translation of internal/external information. AF 314 may support: application influence on traffic routing, accessing NEF 306, and/or interaction with policy framework for policy control. As shown in FIG. 3, the CN 300 may be in communication with the UE 120, RAN 150, and DN 328.

FIG. 4 illustrates an example system architecture 400 for a multi-USIM UE interworking between two systems/networks, in accordance with certain aspects of the present disclosure. As shown in FIG. 4, the UE may be served by separate RANs 404A (e.g., E-UTRAN or NR RAN) and 404B (e.g., E-UTRAN or NR RAN) controlled by separate CNs 406A (e.g., EPC or 5GC) and 406B (e.g., EPC or 5GC). The RAN 404A may provide E-UTRA services or 5G NR services. Similarly, the RAN 404B may provide E-UTRA services or 5G NR services. The UE 120 may operate under one RAN/CN at a time.

In one example, in RAN 404A and RAN 404B, the network node(s) may include gNB(s) and, in CN 406A and CN 406B, the network node(s) may include AMF(s). In one example, in RAN 404A and RAN 404B, the network node(s) may include eNB(s) and, in CN 406A and CN 406B, the network node(s) may include MME(s). In one example, RAN 404A may include eNB(s), CN 406A may include MME(s), RAN 404B may include gNB(s), and CN 406B may include AMF(s).

As noted above, in some cases, a UE equipped with multiple USIMs may not receive downlink data from a first network associated with a first USIM of the UE during periods in which the UE transitions from the first network to a second network associated with a second USIM of the UE.

In the reference example shown in FIG. 4, assume a UE (e.g., UE 120*a*) is equipped with two USIMs (e.g., USIM A and USIM B). In this example, USIM A is associated with RAN 404A and CN 406A and USIM B is associated with RAN 404B and CN 406B. As shown, the UE may be actively communicating with RAN 404A/CN 406A via USIM A (e.g., USIM A may be in connected mode with RAN 404A). While actively communicating with RAN 404A/CN 406A, the UE may decide to transition to RAN 404B/CN 406B to perform one or more communication operations. Here, for example, the UE monitors a paging channel used by RAN 404B and decides to respond to a paging request from RAN 404B. In this case, the UE may enter a connected mode for USIM B in order to monitor the paging channel and/or respond to the paging request. In these situations, if RAN 404A/CN 406A is not aware that the UE has transitioned (or aware of the times that the UE will attempt to transition) to RAN 404B/CN 406B, the RAN 404A/CN 406A may send downlink data to the UE during a time in which the UE is in connected mode via USIM B, and the UE may not receive the downlink data transmission. Missing data in these situations can impact the performance and efficiency of the communication system.

Accordingly, it may be desirable to provide techniques for configuring scheduling gap support information that can be used by the UE to request schedule gaps from a network.

Example Schedule Gap for Multi-SIM UE

Aspects of the present disclosure provide techniques for configuring schedule gap support information that can be used by UEs to request scheduling gaps from a RAN serving the UE via a first USIM (e.g., in connected mode with the RAN). Note, that while many of the following aspects are described with respect to 5G/NR systems, the techniques described herein can be applied to both LTE and 5G. In some aspects, the techniques described herein can also be applied to multi-USIM devices from separate mobile network operators (MNOs) and same MNOs.

The scheduling gap support information (also referred to as schedule gap support information) may include information associated with the UE's transition to other networks/ systems via other USIM(s) of the UE. For example, the schedule gap support information may indicate at least one of: (i) whether the UE is allowed to tune away to another system during connected mode; (ii) whether the UE is allowed to request a schedule gap from a particular network; (iii) whether to allow a schedule gap request from the UE; (iv) different types of schedule gaps supported by the network (e.g., "hard gap," in which the UE completely tunes away from a serving RAN, is supported, or a "soft gap," in which the UE stays on the serving RAN with limited capability, is supported); (v) which band(s) or band combination(s) are supported by schedule gap(s) (e.g., frequency range 1 (FR1) and/or frequency range 2 (FR2)); (vi) duration of schedule gap(s) (e.g., gap length, periodicity etc.) per RAT of the other system; (vii) schedule gap capability for each dual connectivity (DC) combination; (viii) schedule gap policy for each of one or more RATs, etc.

In some aspects, the RAN node may also broadcast its support for allowing schedule gaps, which the UE can take into account before requesting a schedule gap from the RAN node. In some aspects, the UE may use the scheduling gap support information to request a schedule gap from a network (e.g., RAN). The RAN, after receiving the scheduling gap request from the UE, may determine whether to allow the schedule gap, based on the scheduling gap support information.

In some aspects, the scheduling gap support information may be based on a set of UE capabilities. For example, the UE may include scheduling gap support information in the set of UE capabilities and provide the set of UE capabilities to the core network. In this case, the set of UE capabilities (along with the scheduling gap support information) may be transparent to the core network. That is, the core network may not be able to parse (or have knowledge of) the information contained within the set of UE capabilities. The core network may just store the UE capabilities. The core network, in turn, may provide the set of UE capabilities to the RAN during an initial context setup procedure.

Figure 5:
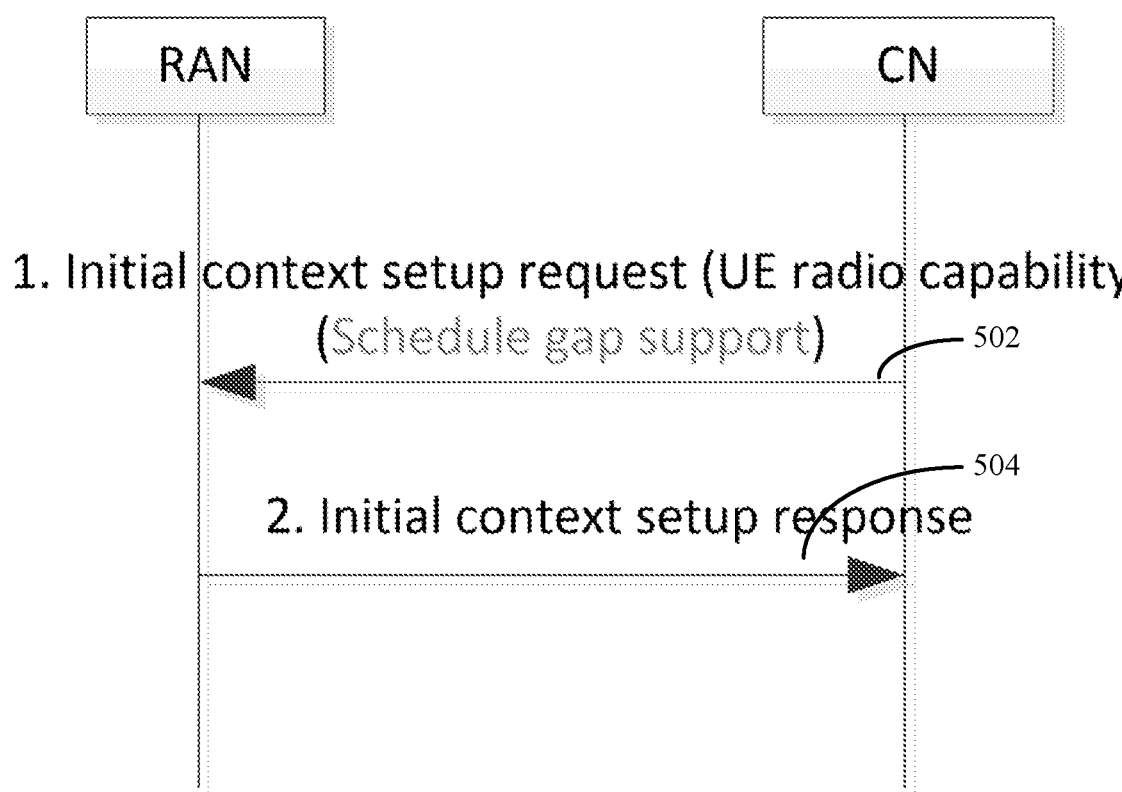
FIG. 5 depicts an example call flow for configuring scheduling gap support information, in accordance with certain aspects of the present disclosure.

FIG. 5 depicts an example call flow 500 in which the CN provides the schedule gap support information to the RAN in a transparent manner, in accordance with certain aspects of the present disclosure.

Although not shown, prior to step 502, the UE may include the schedule gap support information in a set of UE radio capabilities. In one aspect, the UE may transmit the set of UE radio capabilities to the RAN (e.g., during connected mode), and when the UE transitions to idle mode, the RAN may provide the set of UE radio capabilities to the CN. In one aspect, the UE may transmit a radio capability identifier (ID) that identifies a particular set of UE radio capabilities, which includes the schedule gap support information. The UE may transmit the radio capability ID to indicate a set of UE radio capabilities in situations in which the network supports radio capabilities signaling optimization (RACS). The UE may transmit the radio capability ID via a NAS message to the CN.

During an idle to connected mode transition procedure (e.g., in which the UE attempts to transition to connected mode with the RAN), the CN may trigger an initial context setup procedure with the RAN to deliver the set of UE radio capabilities. In step 502, for example, the CN may transmit an initial context setup request to the RAN. The initial context setup request may include the set of UE radio capabilities, which may include the schedule gap support information. At 504, the RAN may transmit an initial context setup response to the CN.

Subsequently, if the UE requests a schedule gap from the RAN (e.g., via an RRC or MAC message), the RAN can use the schedule gap support information to determine whether to allow the schedule gap request from the UE. In one particular case, for example, the schedule gap support information include RAT specific information, such as a schedule gap to 4G/5G systems is allowed but a schedule gap to 2G/3G systems is not allowed. Thus, in this reference example, assuming the UE requests a schedule gap to a 4G/5G system, the RAN may allow (or grant) the request.

Additionally, although not shown in FIG. 5, in some aspects, the RAN node may broadcast allowed schedule gap information (e.g., in a system information block (SIB)) for the UE to use when requesting a schedule gap from the RAN node.

In some aspects, the scheduling gap support information may be based on one or more types of support information received from different devices. For example, in one aspect, the CN (e.g., AMF) may determine the scheduling gap support information based on UE network capability information received from the UE, UE subscription information received from another core network entity (e.g., Home Subscriber Server (HSS), UDM), and/or network policy information received from another core network entity (e.g., PCF). In some aspects, each of the UE network capability information, the UE subscription information, and the network policy information may include a subset of schedule gap support information. For example, the UE network capability information may indicate whether the UE has a capability of requesting schedule gaps to 5G systems when the UE is in connected mode with a 4G system. Continuing with this example, the UE subscription information may indicate whether the 4G system allows UEs to request schedule gaps to 5G systems (and, if so, under what conditions). Still continuing with this example, assuming the RAN receives schedule gap policy information from a PCF (e.g., in a 5G network), the policy information may indicate the maximum duration of schedule gaps in 5G systems. Note, however, that the above scenario is provided as merely a reference example of how the schedule gap support information can be determined based on multiple types of schedule gap information received from different entities in the network. Those of ordinary skill in the art will recognize that other types of conditions and/or parameters may be provided by the UE network capability information, the UE subscription information, and the network policy information.

Figure 6:
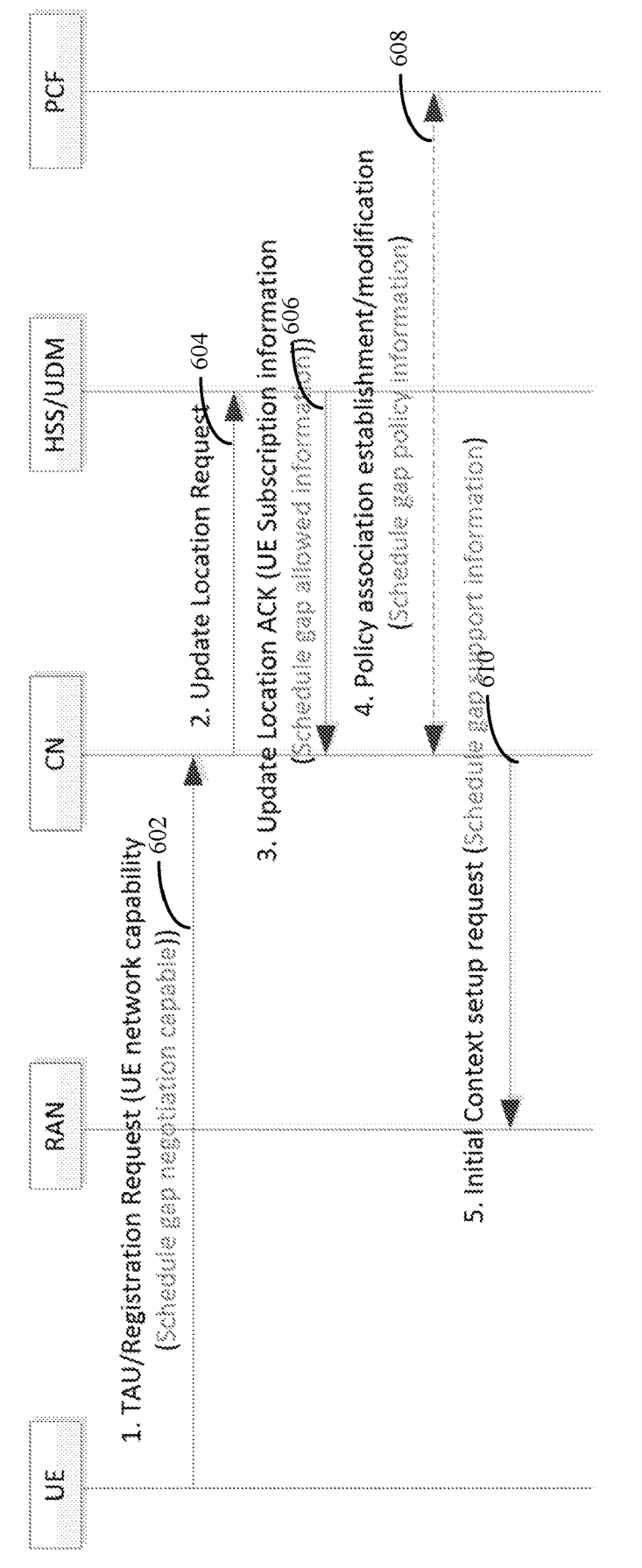
FIG. 6 depicts another example call flow for configuring scheduling gap support information, in accordance with certain aspects of the present disclosure.

FIG. 6 depicts an example call flow 600 in which the core network determines schedule gap support information based on different types of schedule gap information received from different entities, in accordance with certain aspects of the present disclosure.

At 602, the UE may perform an attach procedure, tracking area update procedure, or a registration procedure, during which the UE sends UE network capability information to the CN (e.g., via a NAS message). The UE network capability information may include at least a portion of the schedule gap support information. In FIG. 6, for example, the UE network capability information may include information regarding the UE's capability to negotiate for scheduling gaps (referred to as "Schedule gap negotiation capable" information). The NAS message may include an attach request (e.g., for attach procedure), a tracking area update request (e.g., for tracking area update procedure), or a registration request (e.g., for a registration procedure).

As part of the attach/tracking area update/registration procedure, the CN may retrieve subscription information associated with the UE from a HSS (e.g., in EPC (or 4G) systems) or UDM (e.g., in 5G systems). At 604, for example, the CN may send an update location request to HSS/UDM, and, at 606, may receive an update location acknowledgement from HSS/UDM. The update location acknowledgement may include UE subscription information, which includes at least a(nother) portion of the schedule gap support information. In FIG. 6, for example, the UE subscription information may include information regarding the schedule gaps allowed by the (serving) network (e.g., which band(s)/band combination(s), which RAT(s), which time periods, allowed duration of schedule gaps, DC combinations supported, etc.) (referred to as "Schedule gap allowed information").

In some cases, the CN may also interact with one or more other entities to receive other portions of the schedule gap support information. As shown in FIG. 6, for example, for 5G systems, the CN may retrieve policy information from a PCF during the registration procedure (step 608). The policy information may include at least a(nother) portion of the schedule gap support information. In FIG. 6, for example, the policy information may include information regarding the condition(s) in which schedule gap(s) are allowed (or can be requested), parameters of the schedule gap(s) (e.g., duration, periodicity, etc.), etc. In some cases, the policy information may reflect information regarding a desired operation of the network by an MNO.

At step 610, the CN determines the schedule gap support information based on the information received at steps 602, 606, and/or 608. In one aspect, the CN may determine the schedule gap support information based on an intersection of the information received at steps 602, 606, and/or 608. At step 610, the CN transmits an initial context setup request message that includes the schedule gap support information to the RAN. Although not shown, the CN may receive an initial context setup response from the RAN, after transmitting the initial context setup request message.

Figure 7:
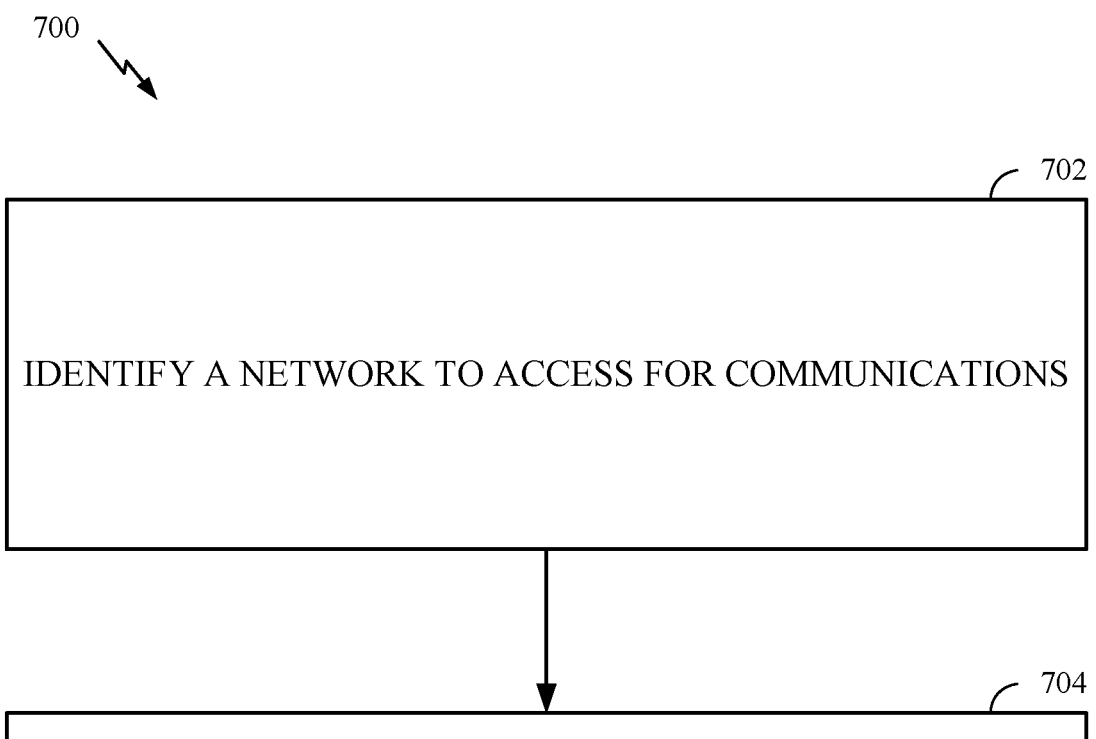
FIG. 7 is a flow diagram illustrating example operations for wireless communication by a UE, in accordance with certain aspects of the present disclosure.

FIG. 7 is a flow diagram illustrating example operations 700 for wireless communication, in accordance with certain aspects of the present disclosure. The operations 700 may be performed, for example, by UE (e.g., such as a UE 120a in the wireless communication network 100). Operations 700 may be implemented as software components that are executed and run on one or more processors (e.g., controller/processor 280 of FIG. 2). Further, the transmission and reception of signals by the UE in operations 700 may be enabled, for example, by one or more antennas (e.g., antennas 252 of FIG. 2). In certain aspects, the transmission and/or reception of signals by the UE may be implemented via a bus interface of one or more processors (e.g., controller/processor 280) obtaining and/or outputting signals.

The operations 700 may begin, at 702, where the UE identifies a network (e.g., RAN/CN) to access for communications. At 704, the UE transmits an indication of schedule gap support information for the UE to the network. The schedule gap support information includes information associated with transitioning from a first RAN associated with a first USIM of the UE to at least a second RAN associated with a second USIM of the UE.

In some aspects, the UE (e.g., at 704) may transmit a set of UE radio capabilities to the network. The set of UE radio capabilities may include the schedule gap support information.

In some aspects, the UE (e.g., at 704) may transmit a capability identifier associated with a set of UE radio capabilities to the network. The set of UE radio capabilities associated with the capability identifier may include the schedule gap support information. The capability identifier may be transmitted via a NAS message.

In some aspects, the UE (e.g., as part of operations 700) may transmit UE network capability information to the network (e.g., step 602 in FIG. 6). The UE network capability information may include at least a portion of the schedule gap support information. The UE network capability information may be transmitted via a NAS message (e.g., attach message during an attach procedure, tracking area update via a tracking area update procedure, or a registration request during a registration procedure).

In some aspects, the UE (e.g., as part of operations 700) may receive information regarding one or more schedule gaps allowed by the network. The UE may transmit a request for a schedule gap, based on the information regarding the one or more schedule gaps allowed by the network.

FIG. 8 is a flow diagram illustrating example operations 800 for wireless communication, in accordance with certain aspects of the present disclosure. The operations 800 may be performed, for example, by a RAN node (e.g., BS 110*a* in the wireless communication network 100). Operations 800 may be implemented as software components that are executed and run on one or more processors (e.g., controller/processor 240 of FIG. 2). Further, the transmission and reception of signals by the RAN node in operations 800 may be enabled, for example, by one or more antennas (e.g., antennas 234 of FIG. 2). In certain aspects, the transmission and/or reception of signals by the RAN node may be implemented via a bus interface of one or more processors (e.g., controller/processor 240) obtaining and/or outputting signals.

The operations 800 may begin, at 802, where the RAN node receives an initial context setup request message (e.g., step 502 in FIG. 5, step 610 in FIG. 6) from a CN node (e.g., AMF/MME) during an initial context setup procedure with the CN node, wherein the initial context setup request message comprises schedule gap support information for a UE associated with the RAN node. The schedule gap support information may include information associated with transitioning from a first RAN associated with a first USIM of the UE to a second RAN associated with a second USIM of the UE. At 804, the RAN node generates an initial context setup response message (e.g., step 504 in FIG. 5) after receiving the initial context setup request message. At 806, the RAN node transmits the initial context setup response message (e.g., step 504 in FIG. 5).

In some aspects, the initial context setup request message (e.g., at 802) comprises a set of UE radio capabilities associated with the UE (e.g., step 502 in FIG. 5). The set of UE radio capabilities may include the schedule gap support information.

In some aspects, the RAN node may transmit an indication of a capability of the RAN node to support one or more schedule gaps and/or an indication of one or more allowed schedule gaps in which the UE transitions from a first connected mode via the RAN node to a second connected mode via another RAN node. For example, the RAN node (e.g., RAN 404A) may be associated with a first USIM (e.g., USIM A) of the UE and the other RAN node (e.g., RAN 404B) may be associated with a second USIM (e.g., USIM B) of the UE. In some aspects, the indication(s) may be transmitted via broadcast signaling (e.g., via a SIB).

FIG. 9 is a flow diagram illustrating example operations 900 for wireless communication, in accordance with certain aspects of the present disclosure. The operations 900 may be performed, for example, by a CN node (e.g., CN node 132*a* in the wireless communication network 100). Operations 900 may be implemented as software components that are executed and run on one or more processors of the CN node. Further, the transmission and reception of signals by the CN node in operations 900 may be enabled, for example, by one or more antennas. In certain aspects, the transmission and/or reception of signals by the CN node may be implemented via a bus interface of one or more processors obtaining and/or outputting signals.

The operations 900 may begin, at 902, where the CN node transmits an initial context setup request message (e.g., step 502 in FIG. 5, step 610 in FIG. 6) to a RAN node (e.g., eNB, gNB) during an initial context setup procedure with the RAN node. The initial context setup request message comprises schedule gap support information for a UE associated with the RAN node. At 904, the CN node receives, in response to the initial context setup request message, an initial context setup response message from the RAN node during the initial context setup procedure (e.g., step 504 in FIG. 5).

In some aspects, the initial context setup request message (e.g., at 902) includes a set of UE radio capabilities associated with the UE. The set of UE radio capabilities may include the schedule gap support information. The set of UE radio capabilities may be transparent to the CN node.

In some aspects, the CN node may determine (e.g., at step 610 in FIG. 6) the schedule gap support information based on a first type of schedule gap information (e.g., UE network capability information), a second type of schedule gap information (e.g., UE subscription information), and a third type of schedule gap information (e.g., UE (or network) policy information). At least one of the UE network capability information, the UE subscription information, or the UE policy information may include a (same or different) portion of the schedule gap support information.

In some aspects, the schedule gap support information may be determined prior to transmitting the initial context setup request message.

In some aspects, the schedule gap support information is determined based on an intersection of the first type of schedule gap information, the second type of schedule gap information, and the third type of schedule gap information.

In some aspects, the CN node (e.g., as part of operations 900) may perform an attach procedure, a tracking area update procedure, or a registration procedure with the UE. The first type of schedule gap information may be received from the UE during the attach procedure, the tracking area update procedure, or the registration procedure (e.g., step 602 in FIG. 6). For example, the first type of schedule gap information may be received via a NAS message (e.g., an attach request, a tracking area update, or a registration request).

In some aspects, the CN node (e.g., as part of operations 900) may retrieve the second type of schedule gap information from another CN node during the attach procedure, the tracking area update procedure, or the registration procedure (e.g., steps 604-606 in FIG. 6). The other CN node may be a HSS or UDM.

In some aspects, the CN node (e.g., as part of operations 900) may retrieve the third type of schedule gap information from another CN node (e.g., step 608 in FIG. 6). The other CN node may be a PCF.

The schedule gap support information (e.g., in operations 700, 800, and 900) may include information associated with transitioning from a first RAN associated with a first USIM of the UE to a second RAN associated with a second USIM of the UE. For example, the schedule gap support information may include at least one of: (i) an indication of whether the UE is allowed to tune away to another RAN during connected mode; (ii) an indication of whether to allow a schedule gap request from the UE; (iii) an indication of one or more types of schedule gaps supported by the CN node (e.g., a "hard gap," in which the UE completely tunes away from the serving RAN may be supported or a "soft gap," in which the UE can stay on the serving RAN with limited capability may be supported); (iv) an indication of one or more bands supported by the schedule gap (e.g., the gap support can be per band or per band combination, the schedule gap may be applied to FR1, the schedule gap may be applied to FR2, the schedule gap may be applied to FR1 but not FR2, the schedule gap may be applied to FR2 but not FR1, or the schedule gap may be applied to a combination of frequencies in FR1 and/or FR2); (v) an indication of amount of time of the schedule gap or the amount of time between schedule gaps (e.g., a maximum or allowed duration for the schedule gap, gap length, periodicity, etc.); (vi) an indication of a schedule gap capability per DC combination (e.g., schedule gap(s) are allowed for EN-DC); or (vii) an indication of a schedule gap policy for each of one or more RATs (e.g., allow schedule gap corresponding to 4G/5G, forbid the schedule gap for 2G/3G).

Figure 10:
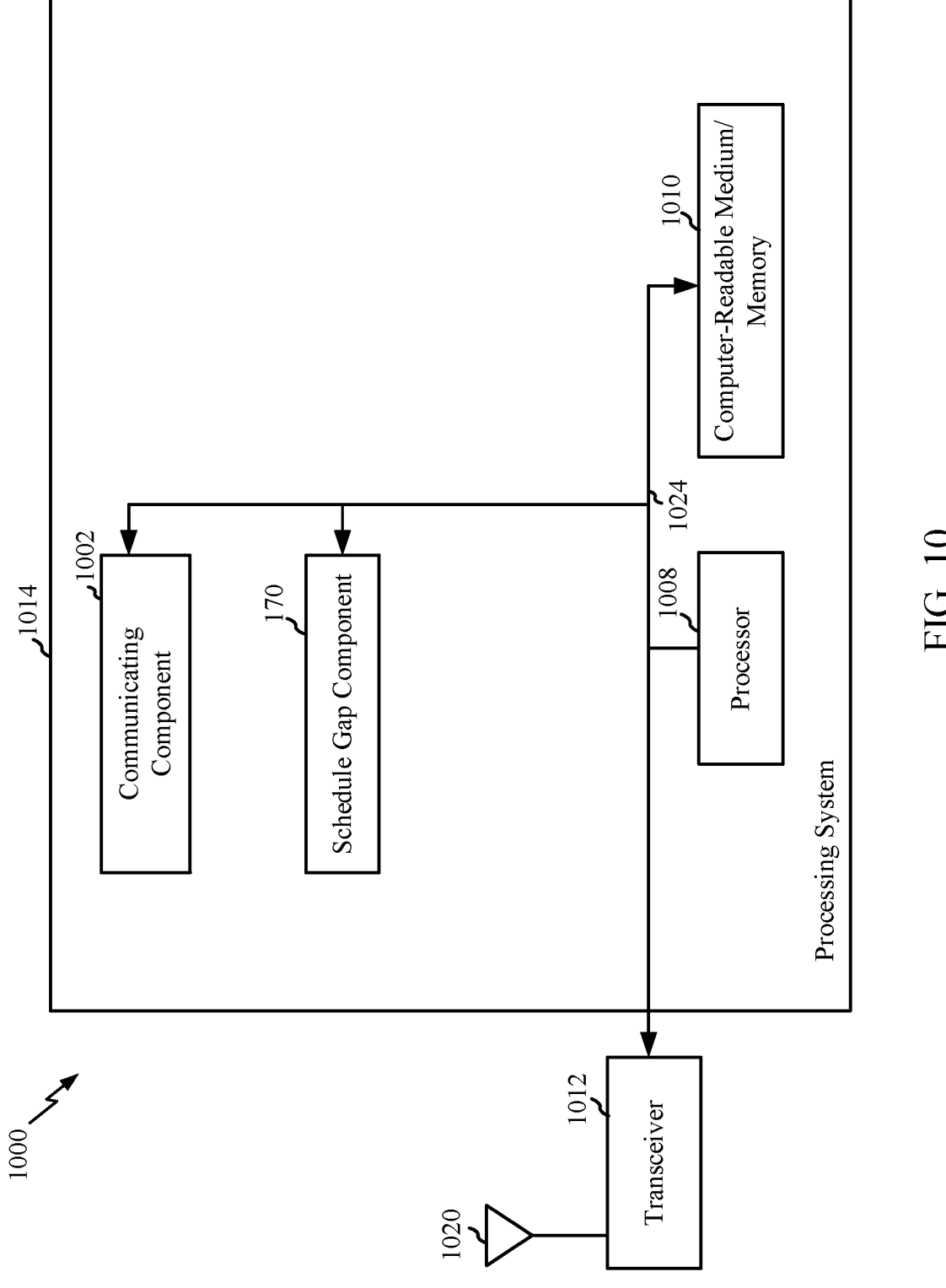
FIG. 10 illustrates a communications device that may include various components configured to perform operations for the techniques disclosed herein in accordance with aspects of the present disclosure.

FIG. 10 illustrates a communications device 1000 that may include various components (e.g., corresponding to means-plus-function components) configured to perform operations for the techniques disclosed herein, such as the operations illustrated in FIG. 7. The communications device 1000 includes a processing system 1014 coupled to a transceiver 1012. The transceiver 1012 is configured to transmit and receive signals for the communications device 1000 via an antenna 1020, such as the various signals described herein. The processing system 1014 may be configured to perform processing functions for the communications device 1000, including processing signals received and/or to be transmitted by the communications device 1000.

The processing system 1014 includes a processor 1008 coupled to a computer-readable medium/memory 1010 via a bus 1024. In certain aspects, the computer-readable medium/memory 1010 is configured to store instructions that when executed by processor 1008, cause the processor 1008 to perform the operations illustrated in FIG. 7 and/or other operations for performing the various techniques discussed herein.

In certain aspects, the processing system 1014 further includes a communicating component 1002 for performing the operations illustrated at 704 in FIG. 7 and/or other communication operations described herein. Additionally, the processing system 1014 includes a schedule gap component 170 for performing the operations illustrated at 702-704 in FIG. 7 and/or operations described herein. The communicating component 1002 and schedule gap component 170 may be coupled to the processor 1008 via bus 1024. In certain aspects, the communicating component 1002 and schedule gap component 170 may be hardware circuits. In certain aspects, the communicating component 1002 and schedule gap component 170 may be software components that are executed and run on processor 1008.

Figure 11:
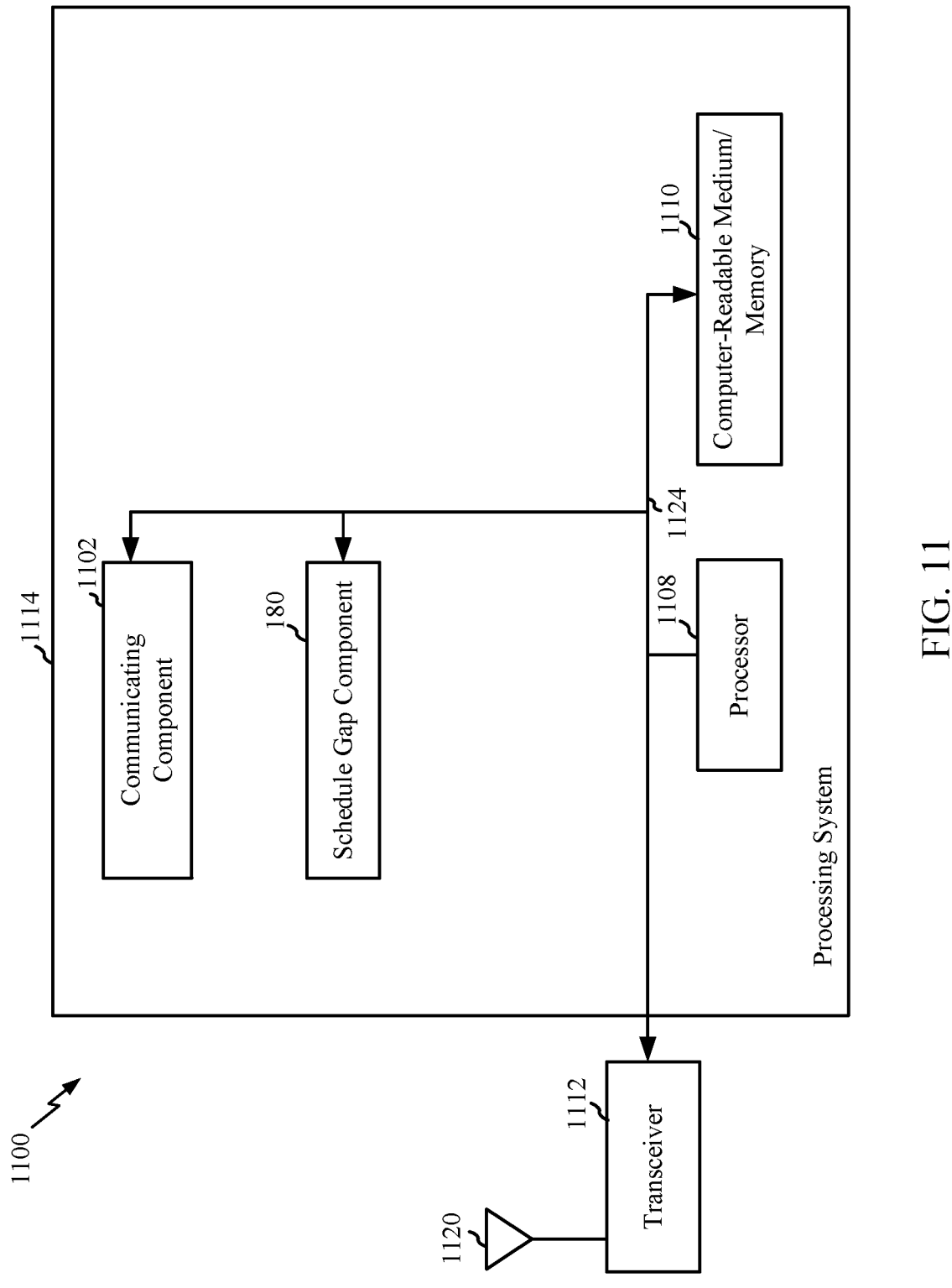
FIG. 11 illustrates a communications device that may include various components configured to perform operations for the techniques disclosed herein in accordance with aspects of the present disclosure.

FIG. 11 illustrates a communications device 1100 that may include various components (e.g., corresponding to means-plus-function components) configured to perform operations for the techniques disclosed herein, such as the operations illustrated in FIG. 8. The communications device 1100 includes a processing system 1114 coupled to a transceiver 1112. The transceiver 1112 is configured to transmit and receive signals for the communications device 1100 via an antenna 1120, such as the various signals described herein. The processing system 1114 may be configured to perform processing functions for the communications device 1100, including processing signals received and/or to be transmitted by the communications device 1100.

The processing system 1114 includes a processor 1108 coupled to a computer-readable medium/memory 1110 via a bus 1124. In certain aspects, the computer-readable medium/memory 1110 is configured to store instructions that when executed by processor 1108, cause the processor 1108 to perform the operations illustrated in FIG. 8 and/or other operations for performing the various techniques discussed herein.

In certain aspects, the processing system 1114 further includes a communicating component 1102 for performing the operations illustrated at 802 and 806 in FIG. 8 and/or other communication operations described herein. Additionally, the processing system 1114 includes a schedule gap component 180 for performing the operations illustrated at 802-806 in FIG. 8 and/or operations described herein. The communicating component 1102 and schedule gap component 180 may be coupled to the processor 1108 via bus 1124. In certain aspects, the communicating component 1102 and schedule gap component 180 may be hardware circuits. In certain aspects, the communicating component 1102 and schedule gap component 180 may be software components that are executed and run on processor 1108.

Figure 12:
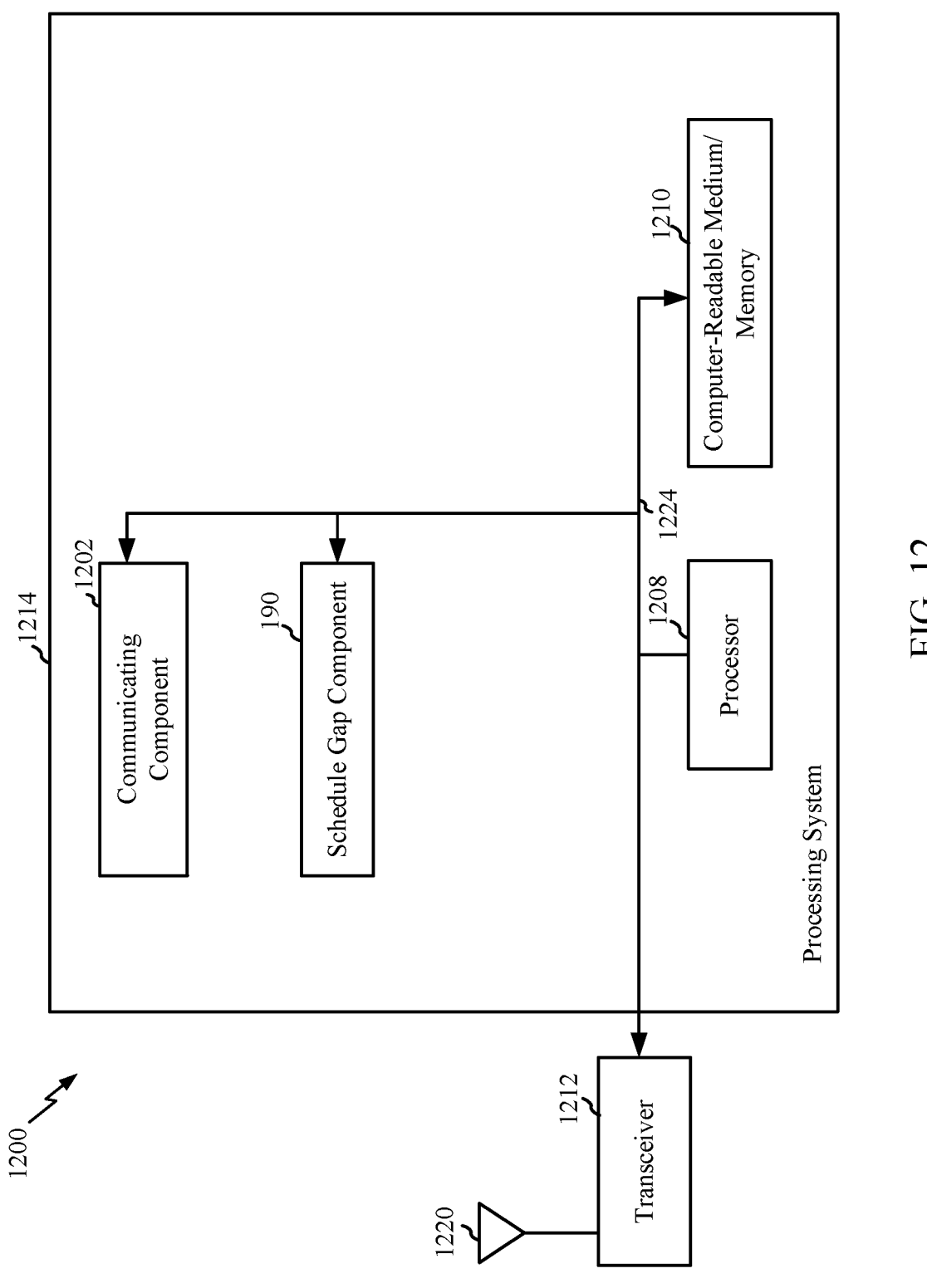
FIG. 12 illustrates a communications device that may include various components configured to perform operations for the techniques disclosed herein in accordance with aspects of the present disclosure.

FIG. 12 illustrates a communications device 1200 that may include various components (e.g., corresponding to means-plus-function components) configured to perform operations for the techniques disclosed herein, such as the operations illustrated in FIG. 9. The communications device 1200 includes a processing system 1214 coupled to a transceiver 1212. The transceiver 1212 is configured to transmit and receive signals for the communications device 1200 via an antenna 1220, such as the various signals described herein. The processing system 1214 may be configured to perform processing functions for the communications device 1200, including processing signals received and/or to be transmitted by the communications device 1200.

The processing system 1214 includes a processor 1208 coupled to a computer-readable medium/memory 1210 via a bus 1224. In certain aspects, the computer-readable medium/memory 1210 is configured to store instructions that when executed by processor 1208, cause the processor 1208 to perform the operations illustrated in FIG. 9 and/or other operations for performing the various techniques discussed herein.

In certain aspects, the processing system 1214 further includes a communicating component 1202 for performing the operations illustrated at 902 and 904 in FIG. 9 and/or other communication operations described herein. Additionally, the processing system 1214 includes a schedule gap component 190 for performing the operations illustrated at 902 and 904 in FIG. 9 and/or operations described herein. The communicating component 1202 and schedule gap component 190 may be coupled to the processor 1208 via bus 1224. In certain aspects, the communicating component 1202 and schedule gap component 190 may be hardware circuits. In certain aspects, the communicating component 1202 and schedule gap component 190 may be software components that are executed and run on processor 1208.

The techniques described herein may be used for various wireless communication technologies, such as NR (e.g., 5G NR), 3GPP Long Term Evolution (LTE), LTE-Advanced (LTE-A), code division multiple access (CDMA), time division multiple access (TDMA), frequency division multiple access (FDMA), orthogonal frequency division multiple access (OFDMA), single-carrier frequency division multiple access (SC-FDMA), time division synchronous code division multiple access (TD-SCDMA), and other networks. The terms "network" and "system" are often used interchangeably. A CDMA network may implement a radio technology such as Universal Terrestrial Radio Access (UTRA), cdma2000, etc. UTRA includes Wideband CDMA (WCDMA) and other variants of CDMA. cdma2000 covers IS-2000, IS-95 and IS-856 standards. A TDMA network may implement a radio technology such as Global System for Mobile Communications (GSM). An OFDMA network may implement a radio technology such as NR (e.g. 5G RA), Evolved UTRA (E-UTRA), Ultra Mobile Broadband (UMB), IEEE 802.11 (Wi-Fi), IEEE 802.16 (WiMAX), IEEE 802.20, Flash-OFDMA, etc. UTRA and E-UTRA are part of Universal Mobile Telecommunication System (UMTS). LTE and LTE-A are releases of UMTS that use E-UTRA. UTRA, E-UTRA, UMTS, LTE, LTE-A and GSM are described in documents from an organization named "3rd Generation Partnership Project" (3GPP). cdma2000 and UMB are described in documents from an organization named "3rd Generation Partnership Project 2" (3GPP2). NR is an emerging wireless communications technology under development.

The techniques described herein may be used for the wireless networks and radio technologies mentioned above as well as other wireless networks and radio technologies. For clarity, while aspects may be described herein using terminology commonly associated with 3G, 4G, and/or 5G wireless technologies, aspects of the present disclosure can be applied in other generation-based communication systems.

In 3GPP, the term "cell" can refer to a coverage area of a Node B (NB) and/or a NB subsystem serving this coverage area, depending on the context in which the term is used. In NR systems, the term "cell" and BS, next generation NodeB (gNB or gNodeB), access point (AP), distributed unit (DU), carrier, or transmission reception point (TRP) may be used interchangeably. A BS may provide communication coverage for a macro cell, a pico cell, a femto cell, and/or other types of cells. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having an association with the femto cell (e.g., UEs in a Closed Subscriber Group (CSG), UEs for users in the home, etc.). A BS for a macro cell may be referred to as a macro BS. A BS for a pico cell may be referred to as a pico BS. A BS for a femto cell may be referred to as a femto BS or a home BS.

A UE may also be referred to as a mobile station, a terminal, an access terminal, a subscriber unit, a station, a Customer Premises Equipment (CPE), a cellular phone, a smart phone, a personal digital assistant (PDA), a wireless modem, a wireless communication device, a handheld device, a laptop computer, a cordless phone, a wireless local loop (WLL) station, a tablet computer, a camera, a gaming device, a netbook, a smartbook, an ultrabook, an appliance, a medical device or medical equipment, a biometric sensor/device, a wearable device such as a smart watch, smart clothing, smart glasses, a smart wrist band, smart jewelry (e.g., a smart ring, a smart bracelet, etc.), an entertainment device (e.g., a music device, a video device, a satellite radio, etc.), a vehicular component or sensor, a smart meter/sensor, industrial manufacturing equipment, a global positioning system device, or any other suitable device that is configured to communicate via a wireless or wired medium. Some UEs may be considered machine-type communication (MTC) devices or evolved MTC (eMTC) devices. MTC and eMTC UEs include, for example, robots, drones, remote devices, sensors, meters, monitors, location tags, etc., that may communicate with a BS, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, which may be narrowband IoT (NB-IoT) devices.

Certain wireless networks (e.g., LTE) utilize orthogonal frequency division multiplexing (OFDM) on the downlink and single-carrier frequency division multiplexing (SC-FDM) on the uplink. OFDM and SC-FDM partition the system bandwidth into multiple (K) orthogonal subcarriers, which are also commonly referred to as tones, bins, etc. Each subcarrier may be modulated with data. In general, modulation symbols are sent in the frequency domain with OFDM and in the time domain with SC-FDM. The spacing between adjacent subcarriers may be fixed, and the total number of subcarriers (K) may be dependent on the system bandwidth. For example, the spacing of the subcarriers may be 15 kHz and the minimum resource allocation (called a "resource block" (RB)) may be 12 subcarriers (or 180 kHz). Consequently, the nominal Fast Fourier Transfer (FFT) size may be equal to 128, 256, 512, 1024 or 2048 for system bandwidth of 1.25, 2.5, 5, 10, or 20 megahertz (MHz), respectively. The system bandwidth may also be partitioned into subbands. For example, a subband may cover 1.08 MHz (e.g., 6 RBs), and there may be 1, 2, 4, 8, or 16 subbands for system bandwidth of 1.25, 2.5, 5, 10 or 20 MHz, respectively. In LTE, the basic transmission time interval (TTI) or packet duration is the 1 ms subframe.

NR may utilize OFDM with a CP on the uplink and downlink and include support for half-duplex operation using TDD. In NR, a subframe is still 1 ms, but the basic TTI is referred to as a slot. A subframe contains a variable number of slots (e.g., 1, 2, 4, 8, 16, . . . slots) depending on the subcarrier spacing. The NR RB is 12 consecutive frequency subcarriers. NR may support a base subcarrier spacing of 15 KHz and other subcarrier spacing may be defined with respect to the base subcarrier spacing, for example, 30 kHz, 60 kHz, 120 kHz, 240 kHz, etc. The symbol and slot lengths scale with the subcarrier spacing. The CP length also depends on the subcarrier spacing. Beamforming may be supported and beam direction may be dynamically configured. MIMO transmissions with precoding may also be supported. In some examples, MIMO configurations in the DL may support up to 8 transmit antennas with multi-layer DL transmissions up to 8 streams and up to 2 streams per UE. In some examples, multi-layer transmissions with up to 2 streams per UE may be supported. Aggregation of multiple cells may be supported with up to 8 serving cells.

In some examples, access to the air interface may be scheduled. A scheduling entity (e.g., a BS) allocates resources for communication among some or all devices and equipment within its service area or cell. The scheduling entity may be responsible for scheduling, assigning, reconfiguring, and releasing resources for one or more subordinate entities. That is, for scheduled communication, subordinate entities utilize resources allocated by the scheduling entity. Base stations are not the only entities that may function as a scheduling entity. In some examples, a UE may function as a scheduling entity and may schedule resources for one or more subordinate entities (e.g., one or more other UEs), and the other UEs may utilize the resources scheduled by the UE for wireless communication. In some examples, a UE may function as a scheduling entity in a peer-to-peer (P2P) network, and/or in a mesh network. In a mesh network example, UEs may communicate directly with one another in addition to communicating with a scheduling entity.

In some examples, two or more subordinate entities (e.g., UEs) may communicate with each other using sidelink signals. Real-world applications of such sidelink communications may include public safety, proximity services, UE-to-network relaying, vehicle-to-vehicle (V2V) communications, Internet of Everything (IoE) communications, IoT communications, mission-critical mesh, and/or various other suitable applications. Generally, a sidelink signal may refer to a signal communicated from one subordinate entity (e.g., UE1) to another subordinate entity (e.g., UE2) without relaying that communication through the scheduling entity (e.g., UE or BS), even though the scheduling entity may be utilized for scheduling and/or control purposes. In some examples, the sidelink signals may be communicated using a licensed spectrum (unlike wireless local area networks, which typically use an unlicensed spectrum).

The methods disclosed herein comprise one or more steps or actions for achieving the methods. The method steps and/or actions may be interchanged with one another without departing from the scope of the claims. In other words, unless a specific order of steps or actions is specified, the order and/or use of specific steps and/or actions may be modified without departing from the scope of the claims.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language of the claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f) unless the element is expressly recited using the phrase "means for" or, in the case of a method claim, the element is recited using the phrase "step for."

The various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components with similar numbering.

The various illustrative logical blocks, modules and circuits described in connection with the present disclosure may be implemented or performed with a general purpose processor, a digital signal processor (DSP), an application specific integrated circuit (ASIC), a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

If implemented in hardware, an example hardware configuration may comprise a processing system in a wireless node. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement the signal processing functions of the PHY layer. In the case of a user terminal 120 (see FIG. 1), a user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further. The processor may be implemented with one or more general-purpose and/or special-purpose processors. Examples include microprocessors, microcontrollers, DSP processors, and other circuitry that can execute software. Those skilled in the art will recognize how best to implement the described functionality for the processing system depending on the particular application and the overall design constraints imposed on the overall system.

If implemented in software, the functions may be stored or transmitted over as one or more instructions or code on a computer readable medium. Software shall be construed broadly to mean instructions, data, or any combination thereof, whether referred to as software, firmware, middleware, microcode, hardware description language, or otherwise. Computer-readable media include both computer storage media and communication media including any medium that facilitates transfer of a computer program from one place to another. The processor may be responsible for managing the bus and general processing, including the execution of software modules stored on the machine-readable storage media. A computer-readable storage medium may be coupled to a processor such that the processor can read information from, and write information to, the storage medium. In the alternative, the storage medium may be integral to the processor. By way of example, the machine-readable media may include a transmission line, a carrier wave modulated by data, and/or a computer readable storage medium with instructions stored thereon separate from the wireless node, all of which may be accessed by the processor through the bus interface. Alternatively, or in addition, the machine-readable media, or any portion thereof, may be integrated into the processor, such as the case may be with cache and/or general register files.

Examples of machine-readable storage media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product.

A software module may comprise a single instruction, or many instructions, and may be distributed over several different code segments, among different programs, and across multiple storage media. The computer-readable media may comprise a number of software modules. The software modules include instructions that, when executed by an apparatus such as a processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module below, it will be understood that such functionality is implemented by the processor when executing instructions from that software module.

Also, any connection is properly termed a computer-readable medium. For example, if the software is transmitted from a website, server, or other remote source using a coaxial cable, fiber optic cable, twisted pair, digital subscriber line (DSL), or wireless technologies such as infrared (IR), radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk, and Blu-ray® disc where disks usually reproduce data magnetically, while discs reproduce data optically with lasers. Thus, in some aspects computer-readable media may comprise non-transitory computer-readable media (e.g., tangible media). In addition, for other aspects computer-readable media may comprise transitory computer-readable media (e.g., a signal). Combinations of the above should also be included within the scope of computer-readable media.

Thus, certain aspects may comprise a computer program product for performing the operations presented herein. For example, such a computer program product may comprise a computer-readable medium having instructions stored (and/or encoded) thereon, the instructions being executable by one or more processors to perform the operations described herein, for example, instructions for performing the operations described herein and illustrated in FIG. 5-9.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

The invention claimed is:

1. A method for wireless communication by a user equipment (UE), comprising:

identifying a network to access for communications;

transmitting an indication of schedule gap support information for the UE to the network, the UE comprising a first universal subscriber identity module (USIM) and a second USIM different from the first USIM, and the schedule gap support information comprising information associated with transitioning from a first radio access network RAN) associated with the first USIM to at least a second RAN associated with the second USIM;

transmitting UE network capability information to the network, wherein the UE network capability information comprises at least a portion of the schedule gap support information;

receiving information regarding one or more schedule gaps allowed by the network; and transmitting a request for a schedule gap, based on the information regarding the one or more schedule gaps allowed by the network.

2. The method of claim 1, further comprising transmitting a set of UE radio capabilities to the network, wherein the set of UE radio capabilities comprises the schedule gap support information.

3. The method of claim 1, wherein the UE network capability information is transmitted, via a non access stratum (NAS) message, during an attach procedure, a tracking area update procedure, or a registration procedure with the network.

4. The method of claim 3, wherein the NAS message comprises an attach request, a tracking area update, or a registration request.

5. The method of claim 1, wherein the schedule gap support information comprises at least one of:

an indication of whether the UE is allowed to tune away to another RAN during connected mode;

an indication of whether to allow a schedule gap request from the UE;

an indication of one or more types of schedule gaps supported by a core network node;

an indication of one or more bands supported by the schedule gap;

an indication of amount of time of the schedule gap;

an indication of a schedule gap capability per dual connectivity (DC) combination; or an indication of a schedule gap policy for each of one or more radio access technologies (RATs).

6. An apparatus for wireless communication, comprising:

at least one processor configured to identify a network to access for communications;

a transmitter configured to:

transmit an indication of schedule gap support information for the apparatus to the network, the apparatus comprising a first universal subscriber identity module (USIM) and a second USIM different from the first USIM, and the schedule gap support information comprising information associated with transitioning from a first radio access network (RAN) associated with the first USIM to at least a second RAN associated with the second USIM; and transmit user equipment (UE) network capability information to the network, wherein the UE network capability information comprises at least a portion of the schedule gap support information;

a receiver configured to receive information regarding one or more schedule gaps allowed by the network, wherein the transmitter is further configured to transmit a request for a schedule gap, based on the information regarding the one or more schedule gaps allowed by the network; and a memory coupled to the at least one processor.

7. The apparatus of claim 6, wherein the transmitter is further configured to transmit a set of UE radio capabilities to the network, wherein the set of UE radio capabilities comprises the schedule gap support information.

8. The apparatus of claim 6, wherein the UE network capability information is transmitted, via a non access stratum (NAS) message, during an attach procedure, a tracking area update procedure, or a registration procedure with the network.

9. The apparatus of claim 6, wherein the schedule gap support information comprises at least one of:

an indication of whether the apparatus is allowed to tune away to another RAN during connected mode;

an indication of whether to allow a schedule gap request from the apparatus;

an indication of one or more types of schedule gaps supported by a core network node;

an indication of one or more bands supported by the schedule gap;

an indication of amount of time of the schedule gap;

an indication of a schedule gap capability per dual connectivity (DC) combination; or an indication of a schedule gap policy for each of one or more radio access technologies (RATs).

10. A method for wireless communication by a radio access network (RAN) node, comprising:

receiving an initial context setup request message from a core network node during an initial context setup procedure with the core network node, wherein the initial context setup request message comprises a set of user equipment (UE) radio capabilities associated with a UE that is associated with the RAN node and that comprises at least a first universal subscriber identity module (USIM) and a second USIM different from the first USIM and wherein the set of UE radio capabilities comprises schedule gap support information for the UE;

generating an initial context setup response message after receiving the initial context setup request message;

transmitting the initial context setup response message; and transmitting an indication of a capability of the RAN node to support one or more schedule gaps in which the UE transitions from a first connected mode via the RAN node to a second connected mode via another RAN node.

11. The method of claim 10, wherein the schedule gap support information comprises information associated with transitioning from a first RAN associated with the first USIM of the UE to a second RAN associated with the second USIM of the UE.

12. The method of claim 10, wherein the schedule gap support information comprises at least one of:

an indication of whether the UE is allowed to tune away to another RAN during connected mode;

an indication of whether to allow a schedule gap request from the UE;

an indication of one or more types of schedule gaps supported by the core network node;

an indication of one or more bands supported by the schedule gap;

an indication of amount of time of the schedule gap;

an indication of a schedule gap capability per dual connectivity (DC) combination; or an indication of a schedule gap policy for each of one or more radio access technologies (RATs).

13. The method of claim 10, wherein the RAN node is associated with the first USIM of the UE and the other RAN node is associated with the second USIM of the UE.

14. The method of claim 10, wherein the indication is transmitted via broadcast signaling.

15. An apparatus for wireless communication, comprising:

a receiver configured to receive an initial context setup request message from a core network node during an initial context setup procedure with the core network node, wherein the initial context setup request message comprises a set of user equipment (UE) radio capabilities associated with a UE that is associated with the apparatus and that comprises at least a first universal subscriber identity module (USIM) and a second USIM different from the first USIM, wherein the set of UE radio capabilities comprises schedule gap support information for the UE, and wherein the apparatus is a radio access network (RAN) node;

at least one processor configured to generate an initial context setup response message after receiving the initial context setup request message;

a transmitter configured to:

transmit the initial context setup response message; and transmit an indication of a capability of the apparatus to support one or more schedule gaps in which the UE transitions from a first connected node via the apparatus to a second connected node via another apparatus; and a memory coupled to the at least one processor.

16. The apparatus of claim 15, wherein the schedule gap support information comprises information associated with transitioning from a first RAN associated with the first USIM of the UE to a second RAN associated with the second USIM of the UE.

17. The apparatus of claim 15, wherein the schedule gap support information comprises at least one of:

an indication of whether the UE is allowed to tune away to another RAN during connected mode;

an indication of whether to allow a schedule gap request from the UE;

an indication of one or more types of schedule gaps supported by the core network node;

an indication of one or more bands supported by the schedule gap;

an indication of amount of time of the schedule gap;

an indication of a schedule gap capability per dual connectivity (DC) combination; or

an indication of a schedule gap policy for each of one or more radio access technologies (RATs).

18. The apparatus of claim 15, wherein the apparatus is associated with the first USIM of the UE and the other apparatus is associated with the second USIM of the UE.

19. The apparatus of claim 15, wherein the indication is transmitted via broadcast signaling.

20. A method for wireless communications by a core network node, comprising:

transmitting an initial context setup request message to a radio access network (RAN) node during an initial context setup procedure with the RAN node, wherein the initial context setup request message comprises a set of user equipment (UE) radio capabilities associated with a UE that is associated with the RAN node and that comprises at least a first universal subscriber identity module (USIM) and a second USIM different from the first USIM, wherein the set of UE radio capabilities comprises schedule gap support information for the UE, and wherein the schedule gap support information comprises information associated with transitioning from a first RAN associated with the first USIM of the UE to a second RAN associated with the second USIM of the UE; and

receiving, in response to the initial context setup request message, an initial context setup response message from the RAN node during the initial context setup procedure.

21. The method of claim 20, wherein the set of UE radio capabilities is transparent to the core network node.

22. The method of claim 20, wherein the schedule gap support information comprises at least one of:

an indication of whether the UE is allowed to tune away to another RAN during connected mode;

an indication of whether to allow a schedule gap request from the UE;

an indication of one or more types of schedule gaps supported by the core network node;

an indication of one or more bands supported by the schedule gap;

an indication of amount of time of the schedule gap;

an indication of a schedule gap capability per dual connectivity (DC) combination; or an indication of a schedule gap policy for each of one or more radio access technologies (RATs).

* * * * *